United States Patent [19]

Shimada et al.

[11] Patent Number: 5,016,031
[45] Date of Patent: May 14, 1991

[54] FILM WINDING/REWINDING APPARATUS

[75] Inventors: Takahisa Shimada; Junichi Tanii, both of Osaka, Japan

[73] Assignee: Minolta Camera Kabushiki Kaisha, Osaka, Japan

[21] Appl. No.: 332,495

[22] Filed: Apr. 3, 1989

[30] Foreign Application Priority Data

| Apr. 4, 1988 | [JP] | Japan | 63-83924 |
| Apr. 4, 1988 | [JP] | Japan | 63-83925 |
| Apr. 4, 1988 | [JP] | Japan | 63-83926 |
| Apr. 5, 1988 | [JP] | Japan | 63-86174 |
| Apr. 5, 1988 | [JP] | Japan | 63-86175 |

[51] Int. Cl.$^5$ .............................. G03B 1/18
[52] U.S. Cl. .................... 354/173.1; 242/71.6; 354/212
[58] Field of Search .......... 242/71.6, 71, 71.4, 242/55.3; 354/170, 212, 173, 173.1, 173.11

[56] References Cited

U.S. PATENT DOCUMENTS

| 2,168,998 | 8/1939 | Lindenberg | 242/71.6 |
| 3,705,338 | 12/1972 | Tsujimoto et al. | 318/446 |
| 4,306,794 | 12/1981 | Fukahori et al. | 354/173 |
| 4,351,595 | 9/1982 | Date et al. | 354/173 |
| 4,400,074 | 8/1983 | Akiyama et al. | |
| 4,455,073 | 6/1984 | Tominaga et al. | 354/173.11 |
| 4,572,636 | 2/1986 | Konno | 354/173.11 |
| 4,576,457 | 3/1986 | Fukuda et al. | 354/173.11 |
| 4,579,435 | 4/1986 | Haraguchi | 354/173.1 |
| 4,697,899 | 10/1987 | Kawamura et al. | |
| 4,728,975 | 3/1988 | Ohara et al. | 354/173.1 |
| 4,752,793 | 6/1988 | Kawamura et al. | 354/173.11 |
| 4,816,851 | 3/1989 | Fukahori et al. | 354/173.1 |

FOREIGN PATENT DOCUMENTS

| 40-28604 | 1/1965 | Japan. |
| 59-140425 | 8/1984 | Japan. |
| 63-257737 | 10/1988 | Japan. |
| 63-257738 | 10/1988 | Japan. |

*Primary Examiner*—Willaim A. Cuchlinski, Jr.
*Assistant Examiner*—Joseph A. Rhoa
*Attorney, Agent, or Firm*—Burns, Doane, Swecker & Mathis

[57] ABSTRACT

This invention relates to a film winding/rewinding apparatus for winding a film after cooking a diaphragm, a mirror, and a shutter of a camera and the rewinding the film at a predetermined time. In the apparatus, the film is wound by the normal rotation of the motor and when the last frame of the film has been detected, the film is rewound by the reverse rotation of the motor.

2 Claims, 12 Drawing Sheets

FILM WINDING/REWINDING APPARATUS

BACKGROUND OF THE INVENTION

1. Field of the Invention

The present invention relates to a film winding-/rewinding apparatus for winding a film after cocking a diaphragm, a mirror, and a shutter of a camera and rewinding the film at a predetermined time.

2. Description of the Related Art

Heretofore, various film winding/rewinding apparatuses have been proposed. In these apparatuses, if a film winding operation is not completed in a predetermined period of time, it is decided that the last frame of the film has been wound.

However, according to the above-described deciding method, it is not decided until a predetermined period of time elapses after tension is applied to the film that the last frame of the film has been wound. Therefore, it takes long to detect that the last frame has been wound.

Similarly to the film winding apparatuses, various constructions of film winding apparatuses have been proposed. One of them is that a spool is driven by a motor and a film winding-stop member is rotated in association with a sprocket.

In the above-described construction, however, when the film travels in the film winding direction, the sprocket is rotated by the film. As a result, the sprocket rotates at a speed lower than that of the spool. Therefore, immediately after the film winding-stop member is stopped in association with the feeding of one frame of the film, tension is applied to the film, with the result that the perforations of the film may be broken. Even though the perforations are not broken, a shock is imparted to parts provided adjacent to the back lid of the camera, which makes a photographer feel uncomfortable. Therefore, there has been a demand for the development of a camera in which tension is not applied to the film.

Another example of a film winding apparatus has been proposed: A differential gear mechanism having a planetary gear mechanism is connected to a motor, and a film winding mechanism is connected to the planetary gear mechanism of the differential gear mechanism. A film winding-stop member for stopping the film winding mechanism from driving when one frame of the film is wound by the film winding mechanism is connected to the film winding mechanism. A cocking mechanism for cocking a diaphragm, a mirror, and a shutter is connected to the planetary gear mechanism through a rotation cam. A film winding-stop lever for stopping the rotation of the film winding-stop member is provided. In this film winding apparatus, after the operation for cocking the diaphragm, the mirror, and the shutter is completed due to the rotation of the rotation cam, the film winding-stop lever is disengaged from the film winding-stop member. When the planetary gear mechanism is driven by the motor, the planetary gear mechanism drives one of the film winding mechanism and the cocking mechanism which has the smaller driving load than the other.

According to this construction, the motor is driven after the completion of exposure, whereby the planetary gear mechanism is driven. At this time, the rotation of the film winding mechanism is stopped by the film winding-stop member which engages with the film winding-stop lever and the load on the cocking operation to be performed by the cocking mechanism is smaller than the load on the film winding operation. Therefore, the planetary gear mechanism rotates the cocking mechanism so that the diaphragm, the mirror, and the shutter are cocked by the cocking mechanism. After the cocking operation is completed, the film winding-stop lever is disengaged from the film winding-stop member by the rotation cam and a cam engaging member engages with the rotation cam. As a result, the rotation of the rotation cam is stopped and the planetary gear mechanism drives the film winding mechanism to wind a film winding operation. When one frame of the film has been wound, the film winding-stop lever engages with the film winding-stop member. As a result, the rotation of the film winding-stop member is stopped, which in turn stops the film winding mechanism from driving. Thereafter, the rotation cam is rotated again through the planetary gear mechanism and when the cam engaging member is disengaged from the rotation cam, the motor is stopped from driving, whereby the film winding operation is completed. When tension is applied to the film while the last frame of the film has been wound, the rotation cam is rotated through the planetary gear mechanism without the engagement of the film winding-stop lever and the film winding-stop member. When the cam engaging member disengages from the rotation cam, the motor is stopped. Thereafter, a film rewinding operation starts.

However, according to this construction, the film winding-stop lever engages with the film winding-stop member during the cocking operation. Therefore, the load on the film winding mechanism is greater than the load on the cocking mechanism and the cocking operation is reliably performed. But if the load on the film winding mechanism is small in disengaging the film winding-stop lever from the film winding-stop member by the rotation cam after the cocking operation is completed, the film winding mechanism is rotated by the planetary gear mechanism before the film winding-stop lever completely disengages from the film winding-stop member, with the result that the film winding-stop lever remains in contact with the film winding-stop releasing portion of the rotation cam. Accordingly, even when the feeding of one frame of the film is completed, the film winding-stop lever does not engage with the film winding-stop member. In this case, it may occur that more than one frame is fed forward.

Further, according to this construction, it is desirable to prepare the subsequent film winding operation in disengaging the rotation cam and the cam engaging member from each other under a small load after the film winding-stop lever engages with the film winding-stop member as a result of the completion of the feeding of one frame of the film. However, if the load on the disengaging operation is too small, the cam engaging member disengages from the rotation cam before the film winding-stop lever engages with the film winding-stop member when the load to feed the film becomes larger than that of normal operation. As a result, it may be erroneously regarded that tension has been applied to the film. Accordingly, the load is required to be heavy to some extent in disengaging the cam engaging member and the rotation cam from each other in order to securely detect that tension has been applied to the film. As a result, the load required for the disengaging operation in preparation for the subsequent operation becomes great. In this case, when, for example, the voltage of a battery is lowered, the rotation cam and the cam engaging member cannot be disengaged from each other.

Further, various constructions of film rewinding apparatuses are known. For example, a film is always pressed against a spool by a film pressing roller. Therefore, when the film is wound, the film is pressed onto the circumferential face of the spool by the roller so that the film is reliably wound around the spool. And a film rewinding fork and the spool are rotated by a motor so as to rewind the film into a patrone connected to the film rewinding fork.

According to this construction, although the film which has been wound around the spool is loosened in the spool chamber by the rotation of the spool in the film rewinding direction during the film rewinding operation, the film is kept pressed against the circumferential face of the spool by the roller while the film is being rewound. Therefore, due to the difference between the film rewinding speed and the rotational speed of the spool, the film is rubbed with each other and damaged or a heavy load is applied to the film rewinding mechanism due to the load of the spool.

SUMMARY OF THE INVENTION

It is therefore an object of the present invention to provide a film feeding apparatus capable of detecting the completion of the winding of the last frame of a film at a high speed.

It is another object of the present invention to provide a film rewinding apparatus in which when the film is rewound, a film is not damaged and a heavy load is not applied to a film rewinding mechanism.

It is a still another object of the present invention to provide a film winding apparatus in which the perforation of the film can be prevented from being damaged and a shock can be prevented from imparting to parts mounted in the vicinity of the back lid of the camera.

It is a further object of the present invention to provide a film winding apparatus in which a film winding operation can be reliably performed after the operation for cocking a diaphragm, a mirror, and a shutter is completed.

It is a still further object of the present invention to provide a film winding apparatus in which tension applied to a film can be reliably detected and a load for disengaging a rotation cam and an engaging member from each other is set to be small after all the frames of the film are wound so that both can be easily disengaged from each other even when the voltage of a battery is lowered.

In accomplishing these and other objects, according to one preferred embodiment of the present invention, there is provided a film feeding apparatus comprising: a motor; a differential gear mechanism connected to said motor; a first cam connected to said differential gear mechanism and having a projection in a peripheral face thereof; a charge mechanism for charging a predetermined mechanism according to a rotation of said first cam; an engaging member which is urged to slide in contact with the peripheral face of said first cam and stops the rotation of said first cam providing that said first cam is rotating with a torque smaller than a predetermined torque and that said charge mechanism completes its operation when said engaging member engages with said projection; a film winding mechanism connected to said differential gear mechanism and adapted for winding a film through said differential gear mechanism when said motor is rotating in a normal direction and said first cam stops rotating as a result of the engagement of said engaging member with the projection of said first cam; a second cam which is connected to said film winding mechanism and rotate together with said film winding mechanism, and has a concave on a peripheral face thereof; a lever having a projection which engages with the concave of said second cam so as to stop a rotations of said second cam and said film winding mechanism and urges the projection of said lever in the direction in which the projection thereof is to come in contact with the peripheral face of said second cam; a first detecting member for detecting whether or not the projection of said lever is in engagement with the concave of said second cam; a second detecting member for detecting that said engaging member is disengaged from the projection of said first cam and that said first cam rotates after the projection of said first cam disengages from said engaging member as a result of the rotation of said first cam by a torque greater than the predetermined torque when one frame of the film is wound by said film winding mechanism; and a control means for rotating said second cam through said differential gear mechanism when the film is wound after the charge operation of said charge mechanism is performed by the rotation of said motor in the normal direction; deciding that one frame of the film has been wound due to both of a detection by means of said first detecting member that the projection of said lever has engaged with the concave of said second cam as a result of the rotation of said second cam and a detection by means of said second detecting member that said first cam continues rotating after said engaging member has engaged with the projection of said first cam and thereafter disengaged therefrom; stopping a rotation of said motor when said second detecting member detects that tension is applied to the film while a last frame of the film has been wound by said film winding mechanism and that said first cam rotates through said differential gear mechanism by disengaging the projection thereof from said engaging member; and deciding that the winding of the last frame of the film is completed when said firs detecting member detects that said second cam has stopped rotating without an engagement of the projection of said lever with the concave of said second cam.

According to the above-described construction, the conditions of the respective cams are detected by the first and second detecting members when tension is applied to the film, so that the control means decides by the detected result that the last frame of the film is decided has been wound around the spool. Therefore, it can detect the completion of the winding of the last frame of a film at a high speed. More specifically, compared with known apparatuses in which the completion of the winding of the last frame of the film around the spool is detected when a film winding operation is not completed in a predetermined period of time, the apparatus in accordance with the present invention is capable of detecting the completion of the winding of the last frame of the film around the spool the moment tension is applied to the film. Therefore, the period of time required for detecting the winding of the last frame of the film is shorter than that required in the known apparatuses.

In another aspect of the present invention, a film rewinding apparatus comprising: a motor; a spool connected to said motor and winding a film; a film rewinding mechanism removably connected to a patrone and connected to said motor and adapted for rewinding the film into said patrone; a clutch member coupled with a connecting portion of said spool and for sliding relative to said spool after rotating by a predetermined angle together with said spool both in normal and reverse directions; and a film pressing member to be pressed against a peripheral face of said spool by an urging member during a film winding operation and moved to be distant from a peripheral face of said spool against the force of the urging member when said clutch member rotates by more than a predetermined angle during a film rewinding operation.

According to another advantage of the present invention, during the film rewinding operation, the clutch member rotates together with the spool and the film pressing member is urged in the direction in which it is moved away from the peripheral face of the spool, so that the film is not pressed by the pressing member. Accordingly, when the film is rewound, the film is not damaged and the load to be applied to members for rewinding the film is not heavy. Therefore, it is unnecessary to provide a mechanism for cutting off the force to be transmitted from the motor to the spool. Further, since the reduction ratio in rewinding the film is not limited, the film can be rewound at a higher speed.

In a further aspect of the present invention a film winding apparatus comprising: a motor; a spool which is driven by said motor and winds a film; a sprocket for engaging with a perforation of the film and being rotated by the film wound by said spool; a sprocket shaft fitted into an opening of said sprocket with a predetermined gap provided therebetween and for rotating by said sprocket; an urging method for always urging said sprocket shaft rotatably in the film winding direction with respect to said sprocket; a film winding-stop member for engaging with said sprocket shaft, rotating by the rotation of said sprocket shaft and stopping from rotating by being engaged by an engaging member when one frame of the film has been wound; and an engaging mechanism disposed so as to be capable of engaging with said spool and adapted for stopping the rotation of said spool when said film winding-stop member and said engaging member engage with each other and releasing said spool when said film winding-stop member and said engaging member disengage from each other.

According to still another advantage of the present invention, when the winding of the film is stopped, the sprocket rotates together with the film in the gap provided between the concave of the sprocket and the projection of the sprocket shaft which has stopped from rotating. Accordingly, a strong tension is not applied to the film, so that the breakage of the perforation of the film can be prevented. Further, a shock is not imparted to parts disposed in the vicinity of the back lid of the camera. Therefore, a photographer holding the camera does not feel uncomfortable.

When the engaging member engages with the film winding-stop member, the rotation of the spool can be stopped by the engaging mechanism. Accordingly, the construction of the mechanism for controlling the motor can be simplified and a strong tension can be prevented from being applied to the film.

In a further aspect of the present invention, a film winding apparatus comprising: a motor; a differential gear mechanism connected to said motor; a film winding mechanism connected to said differential gear mechanism and adapted for winding a film; a film winding-stop member connected to said film winding mechanism; a film winding-stop engaging lever which engages with said film winding-stop member when one frame of the film has been wound so as to stop the rotation of said film winding-stop member, thus a film winding operation performed by said film winding mechanism being stopped, which is capable of being disengaged from said film winding-stop member by a load smaller than the load for the film winding operation performed by said film winding mechanism; a cam having an engagement releasing member, in the periphery thereof, for releasing the engagement of said film winding-stop engaging lever with said film winding-stop member and connected to said differential gear mechanism; a charge mechanism connected to said cam and adapted for charging a predetermined mechanism according to a rotation of said cam; and an engaging member for engaging with said cam by a load greater than the load for rotating said film winding mechanism effected by said differential gear mechanism so as to stop the rotation of said cam.

According to a further advantage of the present invention, after the charge mechanism completes the charging of the diaphragm, the mirror, and the shutter, the film winding-stop lever is disengaged from the film winding-stop member constituting the film winding mechanism by the cam which drives the charge mechanism. At this time, the load to be applied to the film winding mechanism is greater than that to be applied to the charge mechanism, so that the film winding-stop lever is disengaged from the film winding-stop member. Thereafter, a heavy load is applied to the cam so as to stop the rotation of the cam and the film winding mechanism is rotated by a load smaller than that to be applied to the cam through the differential gear mechanism. Accordingly, after the operation for charging the diaphragm, the mirror, and the shutter is completed, the film winding operation can be securely performed.

In a further aspect of the present invention, a film winding apparatus comprising: a motor; a differential gear mechanism connected to said motor; a film winding mechanism connected to said differential gear mechanism and adapted for winding a film; a film winding-stop member connected to said film winding mechanism; a film winding-stop lever for engaging with said film winding-stop member when one frame of the film has been wound so as to stop a rotation of said film winding-stop member in order to stop a film winding operation to be performed by said film winding mechanism; a cam having an engagement releasing member, in a periphery thereof, for releasing the engagement of said film winding-stop lever with said film winding-stop member and connected to said differential gear mechanism; a charge mechanism connected to said cam and adapted for charging a predetermined mechanism according to a rotation of said cam; an engaging member for engaging with said cam so as to stop the rotation of said cam; and an urging member interposed between said engaging member and said film winding-stop lever and urging said engaging member and said film winding-stop lever to come in contact with each other and in the engagement between said cam and said engaging member and in the engagement between said film winding-stop member and said film winding-stop lever, by which a load for releasing one of the engagements when the other of the engagements is released is set to be greater than a load for releasing one of the engagements when the other of the engagements is preferred.

According to a still further advantage of the present invention, during the charge operation by the charge mechanism, the cam disengages from the engaging member and the film winding-stop lever and the film winding-stop member reliably engage with each other by the force of the urging member. During the film winding operation, the cam and the engaging member reliably engage with each other and the film winding-stop lever disengages from the film winding-stop member. That is, when the film winding-stop member is in a disengaged condition, the cam is in an engaged condition. On the other hand, when the cam is in a disengaged condition, the film winding-stop member is in an engaged condition. In order to release the engaged conditions, a great load is required respectively against the force of the urging member. In other words, when one of these two members, namely, the film winding-stop member and the cam is in an engaged condition, the other can be disengaged by a small load. Accordingly, when the film winding-stop member engages with the film winding-stop lever after one frame of the film has been fed forward, the engaging member and the cam can be disengaged from each other by a small load. Therefore, the reduction ratio of a gear which drives the cam can be reduced, so that the cam and the engaging member can be reliably disengaged from each other even though the voltage of a battery is lowered. Furthermore, tension applied to the film can be securely detected.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE INVENTION

Figure 1:
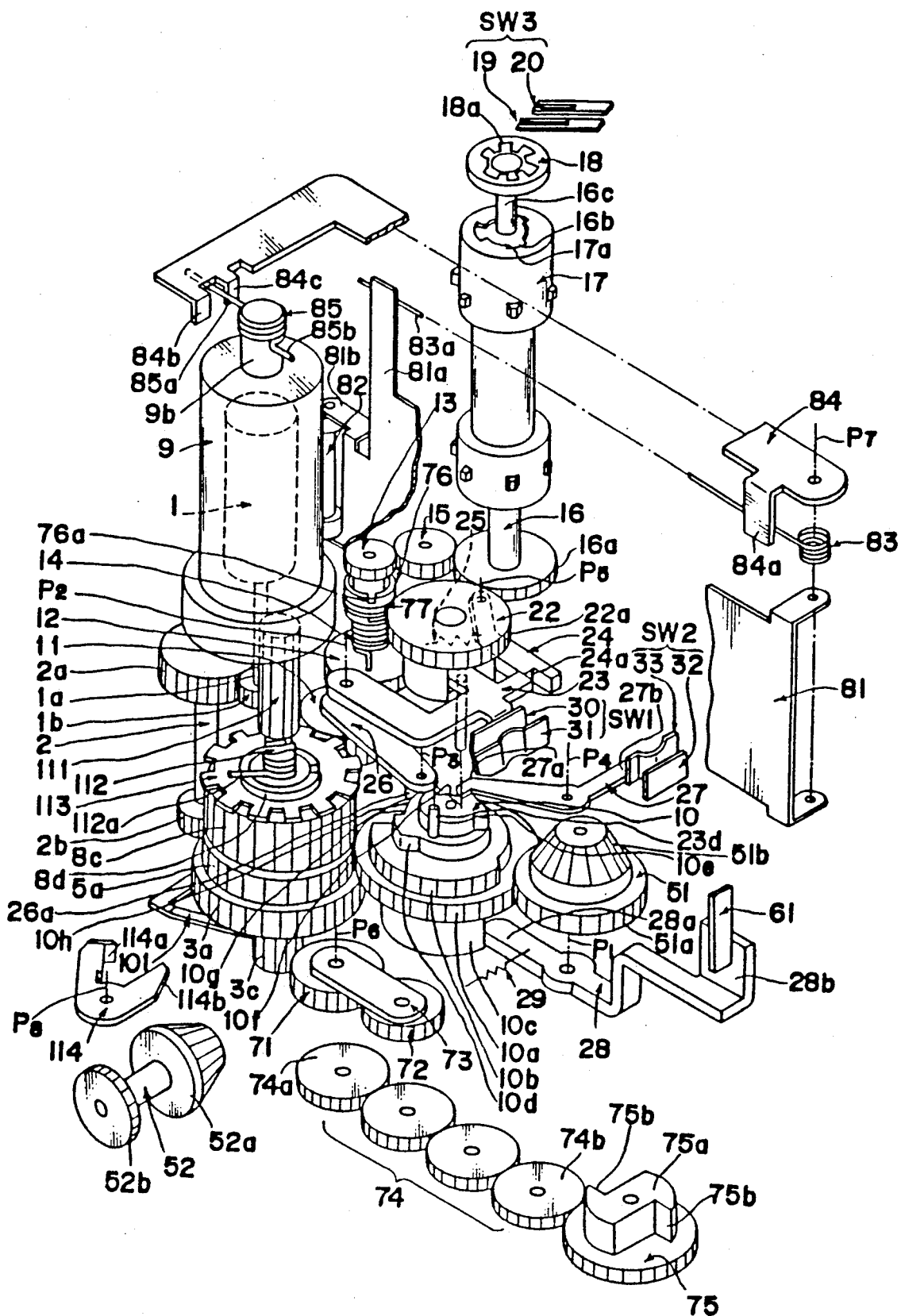
FIG. 1 is a perspective view showing a film winding-/rewinding apparatus of an embodiment in accordance with the present invention.

Before the description of the present invention proceeds, it is to be noted that like parts are designated by like reference numerals throughout the accompanying drawings.

The embodiment of the present invention is described with reference to FIG. 1 through FIG. 15.

The outline of a film-winding/rewinding apparatus in accordance with the present invention is described hereinbelow with reference to FIG. 1.

Figure 2:
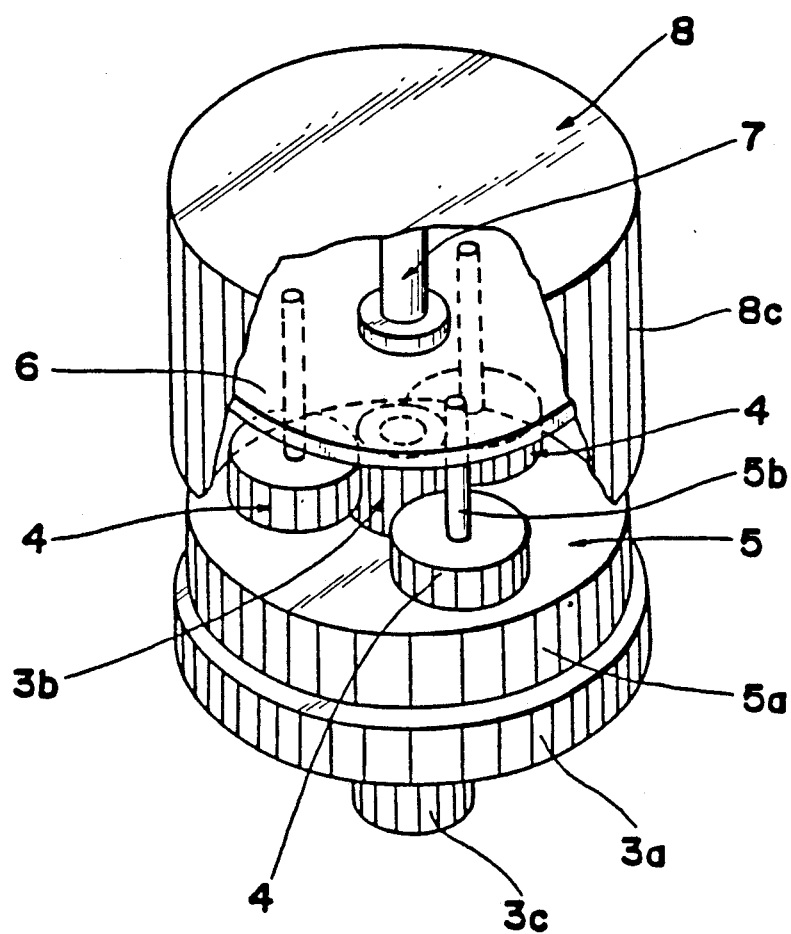
FIG. 2 is a partial cutaway view showing the planetary gear mechanism of the film winding/rewinding apparatus.
Figure 3:
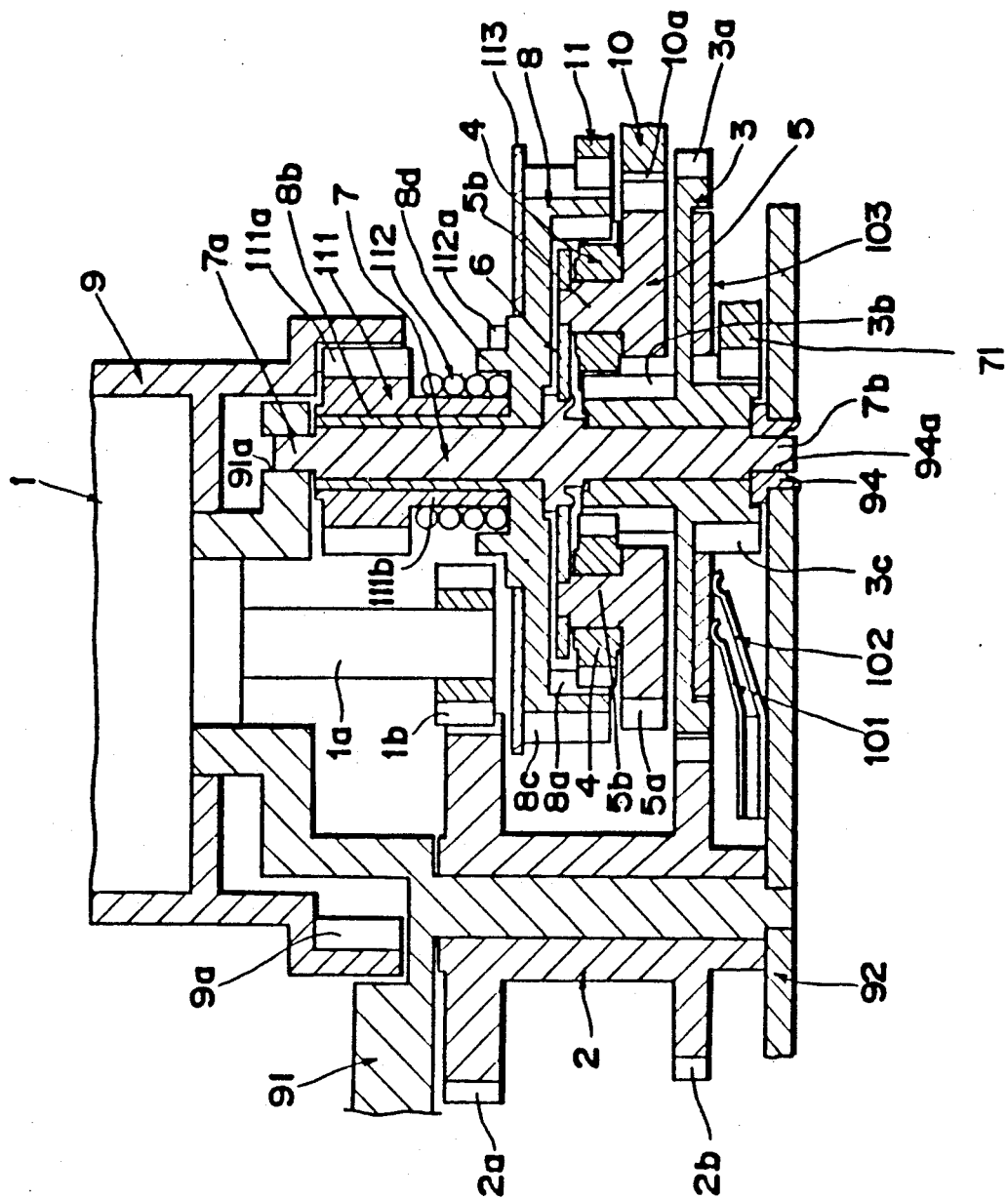
FIG. 3 is a sectional view of the planetary gear mechanism.

Referring to FIG. 1, a reversible motor 1 is contained in a spool 9. As shown in FIG. 3 as well, a gear 1b mounted on the shaft 1a of the motor 1 engages with the large gear 2a of a reduction gear 2. The small gear 2b of the reduction gear 2 engages with the large gear 3a of a reduction gear 3. As shown in FIG. 2, the first small gear 3b of the reduction gear 3 engages with three planetary gears 4, 4, and 4. Each of the planetary gears 4 is rotatable about a shaft 5b integrated with a gear 5. The upper portion of the shaft 5b is mounted on a carrier plate 6 mounted on a shaft 7 so that the carrier plate 6 is rotatable together with the shaft 7. The shaft 7 is rotatable with the upper portion 7a thereof fitted into the opening 91a of a bed plate 91 fixed to a body (not shown) and the lower portion 7b thereof fitted into the opening 94a of a bearing 94 mounted on a bed plate 92 fixed to the body. The shaft 7 supports the reduction gear 3 and a reduction gear 8, the detail of which is described later. The three planetary gears 4, 4, and 4 engage with an internal gear 8a mounted inside the reduction gear 8. A planetary gear mechanism comprises the first small gear 3b of the reduction gear 3, the planetary gears 4, 4, and 4, the internal gear 8a of the reduction gear 8, the gear 5, and the carrier plate 6. That is, the rotations of the planetary gears 4, 4, and 4 around the shafts 5b, 5b, and 5b, respectively, allow the rotation of the reduction gear 8 through the internal gear 8a. The revolutions of the planetary gears 4, 4, and 4 around the shaft 7 allow the gear 5 and the carrier plate 6 to rotate together with the shaft 7. The mechanism for rotating or revolving the planetary gears 4 is as follows: When the load to be applied to the reduction gear 8 is greater than that to be applied to the gear 5, the planetary gears 4, 4, and 4 revolve, while when the load to be applied to the former is smaller than that to be applied to the latter, the planetary gears 4, 4, and 4 rotate. A gear 111 is rotatably mounted on the periphery of the upper portion 8b of the reduction gear 8. A spring 112 is mounted on the peripheral face of the lower portion 111b of the gear 111. An arm 112a projecting from the lower portion of the spring 112 is fitted in the notch of a ring-shaped projection 8d formed on the reduction gear 8. The rotation of the reduction gear 8 is transmitted to the gear 111 through the spring 112. The gear 111 engages with an internal gear 9a integrated with the spool 9. Therefore, the rotation of the gear 111 causes the spool 9 to rotate. The torque transmittable between the spring 112 and the gear 111 is sufficient for the spool 9 to wind a film. The spring 112 and the gear 111 are not in a sliding contact relationship, i.e., the urging force of the spring 112 is transmitted to the gear 111. The spring 112 is provided so that a photographer opens a back lid of the camera and manually pulls out the film without rewinding the film wound around the spool 9. In this case, the force of the spring 112 is not transmitted to the gear 111, i.e., the spring 112 and the gear 111 are in a sliding contact relationship.

A gear 8c mounted in the peripheral face of the reduction gear 8 engages with a gear 11. Referring to FIG. 1, the gear 11 engages with a gear 12 connected with a gear 13 disposed on the upper portion of the gear 12 through a spring 14. The gear 13 rotates together with the spring 14 or both the gear 13 and the spring 14 rotate in a sliding contact relationship. The top end portion 14a of the spring 14 is fitted in the notch 76a of a cylinder 76 coaxial with the gears 12 and 13. The cylinder 76 can rotate around the common axis with the gears 12 and 13. A spring 77 is wound to the cylinder 76. The top end portion of the spring 77 is fixed to an unshown stationary pin not provided with the cylinder 76. Accordingly, the cylinder 76 is rotatable counterclockwise by a small torque, but unrotatable clockwise by the motor 1 even though the maximum torque is applied from the motor 1 thereto. The gear 13 engages with a gear 15 which engages with a gear 16a integrated with a sprocket shaft 16. The gear 16a engages with a gear 22a integrated with the peripheral face of a film winding-stop member 22 (hereinafter referred to as winding-stop member 22 and this is applied to all film winding-stop members).

Figure 5:
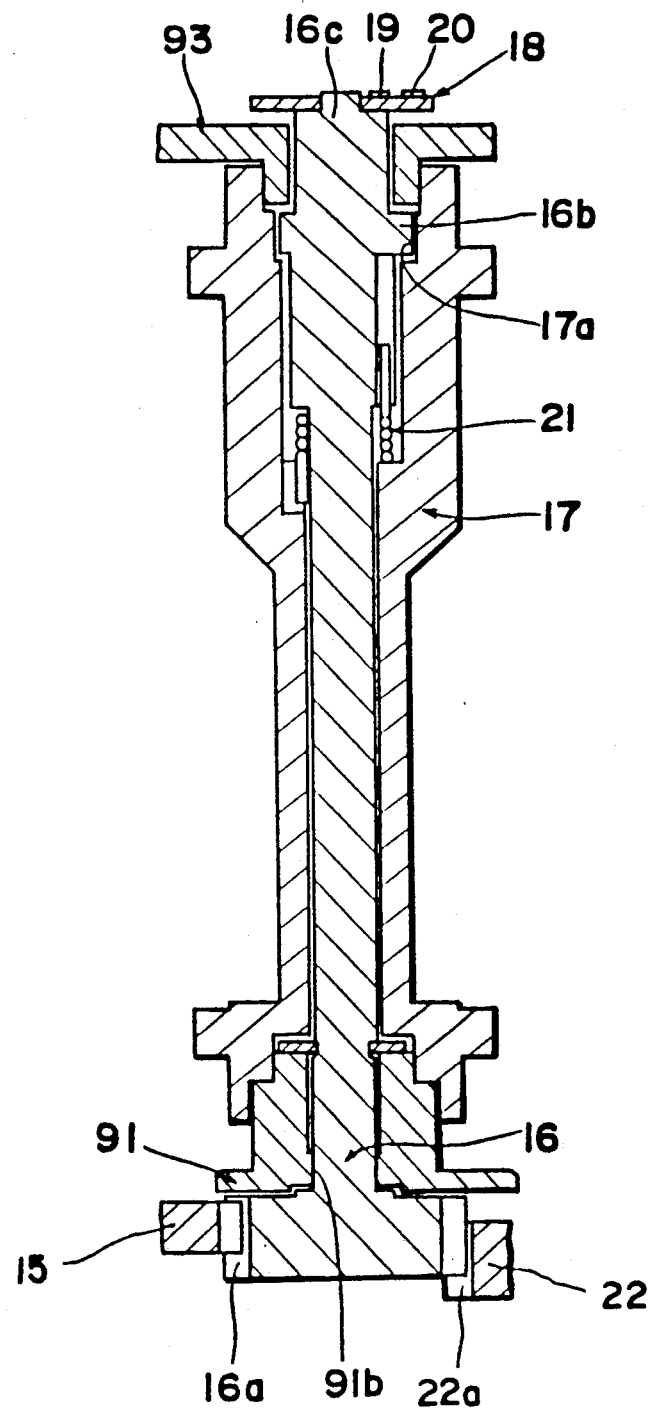
FIG. 5 is a sectional view of the sprocket section of the film winding/rewinding apparatus.

As shown in FIG. 5, the sprocket shaft 16 is rotatably fitted into the opening 91b of the bed plate 91 and a projection 16b formed on the upper portion of the sprocket shaft 16 is rotatably fitted into the concave 17a formed on the internal face of a sprocket 17. There is a small gap between the sprocket shaft 16 and the sprocket 17 in the rotational direction of the sprocket shaft 16. The spring 21 urges the sprocket shaft 16 in the film winding direction with respect to the sprocket 17. A substrate 18 having conductor patterns 18a and mounted on the upper portion 16c of the sprocket shaft 16 rotates together with the sprocket shaft 16. Contacts 19 and 20 functioning as a third switch SW3 slide relative to the patterns 18a of the substrate 18. The switch SW3 is repeatedly turned on and off when the sprocket 17 is rotating.

Referring to FIG. 1, the gear 5a engages with the gear 10a of a rotation cam 10. Formed on the rotation cam 10 are a notched gear 10b, a mirror/shutter cocking cam 10c, a roller cam 10d, functioning as a projection, mounted on the notched gear 10b, a film winding-stop releasing cam 10e, and a switch cam concave 10f. The notched gear 10b engages with the spur gear 51a of a first diaphragm cocking gear 51 after the rotation gear 10 rotates a predetermined amount counterclockwise. The bevel gear 51b of the first diaphragm cocking gear 51 engages with the bevel gear 52a of a second diaphragm cocking gear 52. Accordingly, the second diaphragm cocking gear 52 rotates vertically to the rotational direction of the first diaphragm cocking gear 51, which in turn allows the spur gear 52b of the second diaphragm cocking gear 52 to engage with an unshown diaphragm ring gear, thus causing to release a diaphragm lever. Consequently, the aperture size is increased. One of the end portion 28a of a mirror cocking lever 28 urged counterclockwise about an axis $P_1$ by a spring 29 contacts with the peripheral face of the mirror/shutter cocking cam 10c. With the counterclockwise rotation of the rotation cam 10, the distance between the center of the rotation cam 10, namely, the mirror/shutter cocking cam 10c and the peripheral face of the mirror/shutter cocking cam 10c becomes greater and rapidly small when the rotation cam 10 rotates a certain amount. Accordingly, when the rotation cam 10 rotates counterclockwise, the mirror cocking lever 28 is rotated clockwise about the axis $P_1$ against the contraction force of the spring 29. A mirror lever 61 confronts the bent portion 28b of the other end portion of the mirror cocking lever 28 after a shutter is released. When the mirror cocking lever 28 rotates clockwise, the mirror lever 61 is pressed toward the left in FIG. 1, with the result that an unshown mirror descends and at the same time the shutter is cocked.

Figure 6:
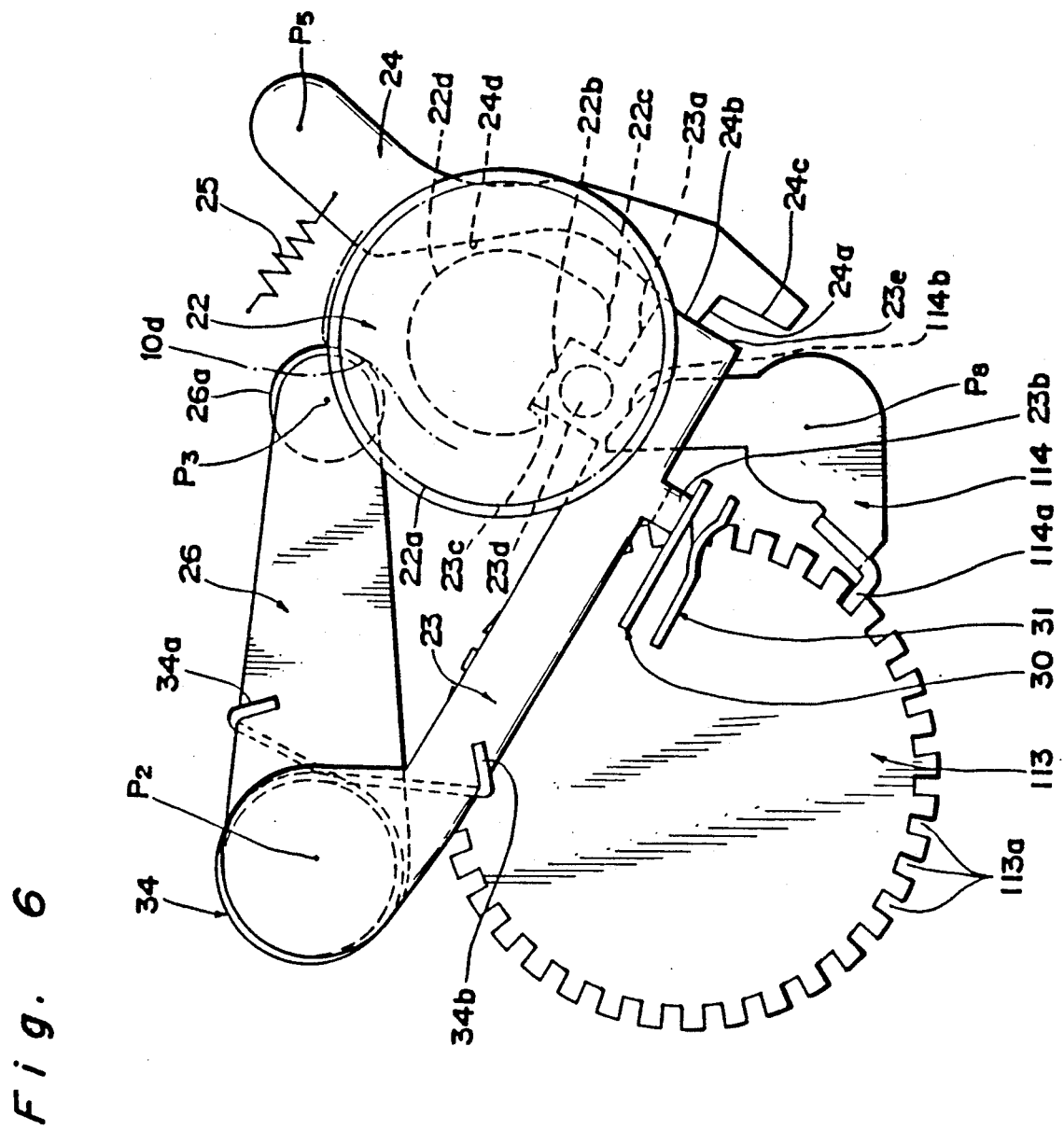
FIG. 6 is a plan view showing the film winding-stop lever and members disposed in the vicinity thereof of the film winding/rewinding apparatus.

A roller 26a whose axis is supported by a roller-supporting plate 26 at one end portion thereof serving as an engaging member is disposed within the rotational locus of the roller cam 10d. As shown in FIG. 6, the roller 26a is urged clockwise about an axis $P_2$ by a torsion coil spring 34 functioning as an urging member. The spring 34 is interposed between the roller-supporting plate 26 and a film winding-stop lever 23 serving as an engaging lever, the detail of which is described later. When the rotation cam 10 has rotated counterclockwise by a predetermined amount, the roller cam 10d is brought in contact with the roller 26a of the roller-supporting plate 26. Unless a torque more than a predetermined value is applied to the rotation cam 10, it is incapable of rotating counterclockwise. When the predetermined amount of torque or more is imparted to the rotation cam 10, the rotation cam 10 rotates counterclockwise while it is allowing the rotation of the roller-supporting plate 26 about the axis $P_2$ counterclockwise. When the projection 23c of the winding-stop member 23 engages with the concave 22b of a winding-stop member 22, a pin 23d formed on the winding-stop lever 23 is disposed in the rotational locus of the winding-stop releasing cam 10e. When the rotation cam 10 rotates counterclockwise, the winding-stop releasing cam 10e is brought into contact with the pin 23d of the winding-stop lever 23. As a result, the pin 23d rotates the winding-stop lever 23 clockwise about the axis $P_2$. Consequently, the projection 23c of the winding-stop lever 23 disengages from the concave 22b of the winding-stop member 22. The winding-stop lever 23 is urged counterclockwise by the torsion coil spring 34 interposed between the winding-stop lever 23 and the roller-supporting plate 26 and a leaf spring 30 mounted in contact with the bent portion of the winding-stop lever 23. The leaf spring 30 and a leaf spring 31 which confront each other compose a first switch SW1. The first switch SW1 is turned off when the projection 23c of the winding-stop lever 23 is fitted into the concave 22b of the winding-stop member 22 and turned on when the former disengages from the latter.

One end portion 27b of a switch lever 27 which rotates about an axis $P_4$ is urged counterclockwise by a leaf spring 33. Thus, the other end portion 27a of the switch lever 27 is brought into contact with the switch cam concave 10f of the rotation cam 10. The leaf spring 33 and a leaf spring 32 which confront each other compose a second switch SW2. When the end portion 27a of the switch lever 27 is in contact with the switch cam concave 10f of the rotation cam 10, the second switch SW2 is turned off and turned on when the former is not in contact with the latter.

When the rotation cam 10 rotates counterclockwise, the respective cams thereof and the notched gear 10b are arranged in the following order. When the rotation cam 10 rotates by a predetermined amount, the notched gear 10b engages with the spur gear 51a of the first diaphragm cocking gear 51 and at the almost same time, the mirror/shutter cocking cam 10c starts rotating the mirror cocking lever 28 clockwise. At the almost same time, the end portion 27a of the switch lever 27 disengages from the switch cam concave 10f. Consequently, the second switch SW2 turns on. When the mirror/shutter cocking cam 10c rotates by a certain amount, its radius becomes rapidly small, with the result that the mirror cocking lever 28 is rotated counterclockwise about the axis $P_1$ by the spring 29 and returns to the original position. Thereafter, the notched gear 10b and the spur gear 51a disengage from each other. Even after the mirror are shutter are cocked, a diaphragm continues to be cocked for some time so that each member is over-cocked separately. Accordingly, a great amount of load in over-cocking is not applied simultaneously. That is, after the mirror and shutter are over-cocked, only the diaphragm is over-cocked. Thereafter, the winding-stop releasing cam 10e contacts with the pin 23d of the winding-stop lever 23. As a result, the winding-stop lever 23 is rotated clockwise. Thereafter, the roller cam 10d is brought into contact with the roller 26a of the roller-supporting plate 26, with the result that the roller-supporting plate 26 is rotated counterclockwise. The moment the roller 26a is brought into contact with the roller cam 10d on its peripheral face whose radius is large, the end portion 27a of the switch lever 27 is brought in contact with the switch cam concave 10f. Then, the roller 26a is brought into contact with the concave 10g. Thereafter, the roller 26a slides along a gentle slope 10h again, then, returns to the original position.

As shown in FIG. 6, the peripheral face 24b of a film winding-stop engaging lever 24 urged clockwise about an axis $P_5$ by a spring 25 is in contact with the end portion 23e of the winding-stop lever 23. When the winding-stop lever 23 rotates clockwise about the axis $P_2$ and the projection 23c of the winding-stop lever 23 disengages from the concave 22b of the winding-stop member 22, the winding-stop engaging lever 24 rotates clockwise about the axis $P_5$. As a result, the end portion 24c of the winding-stop engaging lever 24 is brought into contact with the end portion 23e of the winding-stop lever 23. When the winding-stop releasing cam 10e of the rotation cam 10 moves past the pin 23d, that is, a certain point where the cam 10e contacts with the pin 23d, the winding-stop lever 23 is urged to rotate counterclockwise by the urging force of the spring 34. But at this time, the peripheral face 23a of the winding-stop lever 23 is in contact with the peripheral face 24a of the winding-stop engaging lever 24. Therefore, the winding-stop lever 23 is prevented from rotating counterclockwise and the projection 23c of the winding-stop lever 23 is not allowed to engage the concave 22b of the winding-stop member 22.

Referring to FIG. 6, a lever 114 rotatable about an axis $P_8$ is urged clockwise. The bent portion 114a of the lever 114 engages with one of gear tooth space 113a formed on the peripheral face of an engaging plate 113 mounted on the reduction gear 8. The other end portion 114b of the lever 114 is disposed to confront the pin 23d of the winding-stop lever 23 below the winding-stop lever 23. When the winding-stop lever 23 rotates clockwise about the axis $P_2$, the pin 23d mounted on the lower face of the winding-stop lever 23 contacts with the end portion 114b of the lever 114. As a result, the lever 114 is rotated counterclockwise about the axis $P_8$ and the bent portion 114a of the lever 114 disengages from the gear tooth space 113a formed on the peripheral face of the engaging plate 113.

Referring to FIG. 1, a second small gear 3c of the reduction gear 3 provided at the lower portion thereof engages with a film rewinding gear 71 (hereinafter referred to as rewinding gear and this is applied to other film rewinding members). The film rewinding gear 71 engages with a change-over planetary gear 72 whose shaft is supported by the portion near one end of a carrier 73. The carrier 73 rotates about an axis $P_6$ which the gear 71 rotates about. The change-over planetary gear 72 confronts a gear 74a disposed leftmost of a rewinding gear train 74. A gear 74b disposed rightmost of the rewinding gear train 74 engages with a rewinding fork gear 75. The projection 75b of the rewinding fork 75a integrated with the rewinding fork gear 75 on the upper portion thereof engages with the axis of a patrone. According to this construction, when the rewinding fork gear 75 rotates clockwise, the film is rewound into the patrone.

Figure 4:
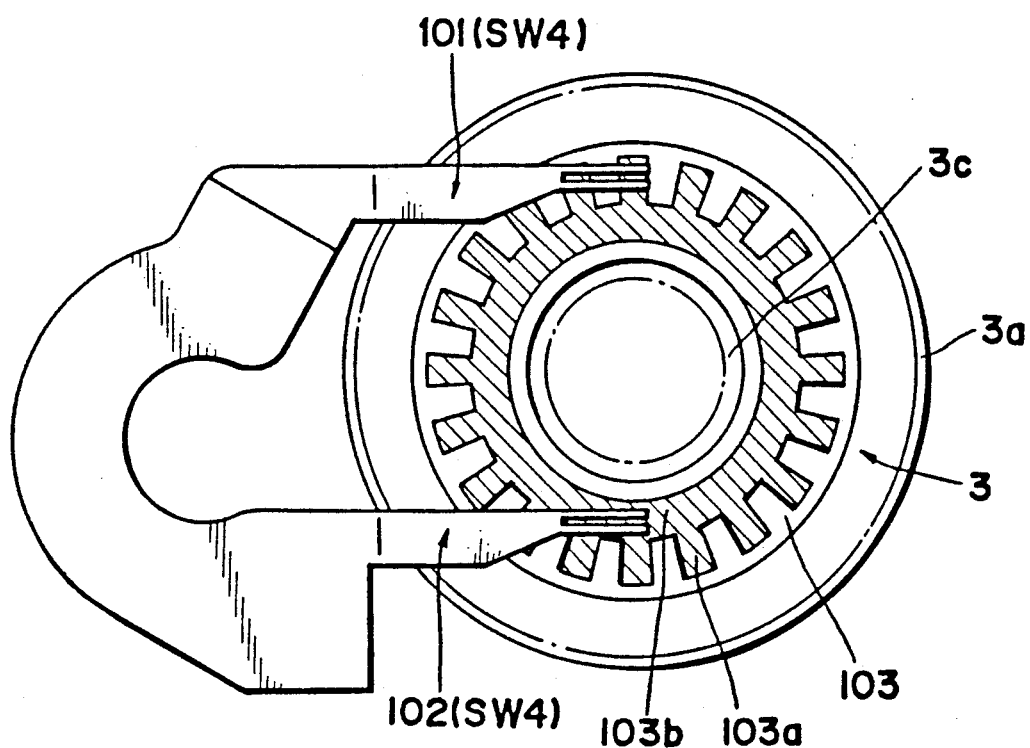
FIG. 4 is a bottom view of the motor speed detecting switch portion of the film winding/rewinding apparatus.

As shown in FIGS. 1, 3, and 4, an encoder plate 103 is mounted on the lower portion of the large gear 3a of the reduction gear 3. A pair of contacts 101 and 102 fixed to the bed plate 92 relatively slide on the encoder plate 103. The contact 101 slides on a comb-shaped conductor pattern 103a and the contact 102 slides on a common conductor pattern 103b, thus composing a fourth switch SW4 which produces a pulse when the encoder plate 103 rotates. The rotational speed of the motor 1 can be detected by the pulse. The motor 1 is provided with two kinds of coils which differ in their characteristics. The characteristic of the motor is changed when the rotational speed of the motor reaches predetermined speed.

Figure 7:
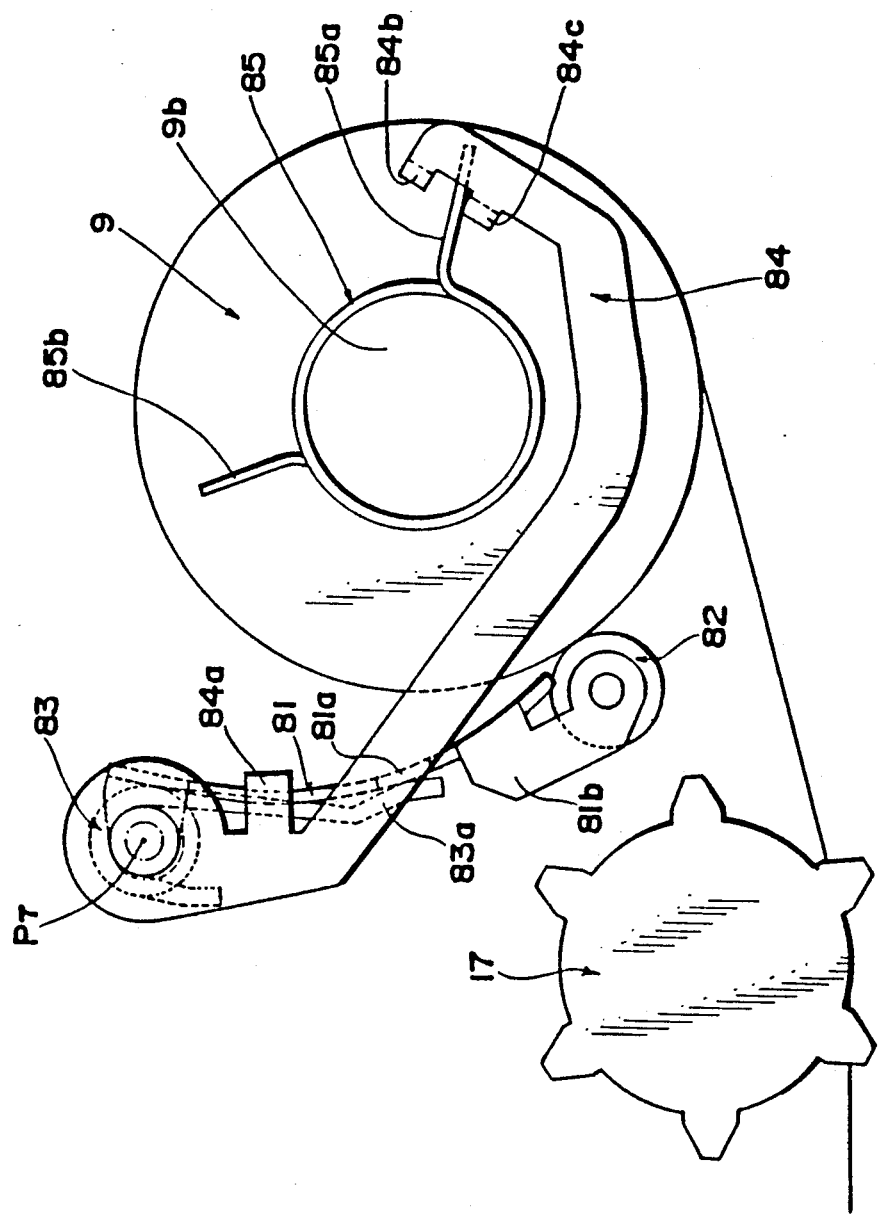
FIG. 7 is a plan view showing the film roller releasing section of the film winding/rewinding apparatus.

As shown in FIGS. 1 and 7, a roller 82 which presses the film against the peripheral face of the spool 9 is rotatably supported by the bent portion 81b disposed at an end portion of a roller holder 81 rotatable about an axis $P_7$. The projection 81a of the roller holder 81 is urged counterclockwise about an axis $P_7$ by the arm 83a of a torsion coil spring 83. Accordingly, the roller 82 is brought into contact with the peripheral face of the spool 9 so that the film is tightly wound around the spool 9. A spring 85 is mounted around a cylinder 9b which has a small diameter and is disposed above the spool 9. One end portion 85a of the spring 85 is inserted into the gap between the bent portions 84b and 84c which are the peripheral faces of a roller releasing lever 84. The lever 84 rotates about the axis $P_7$ about which the roller holder 81 rotates as well. The other end portion 85b of the spring 85 contacts with a fixed pin 9' when the spool 9 rotates by a predetermined amount in the direction opposite to the direction in which the film is wound so that the spring 85 may not rotate together with the spool 9. The bent portion 84a in the vicinity of the axis $P_7$ of the roller releasing lever 84 contacts with the ar 83a of the torsion coil spring 83 due to the clockwise rotation of the roller releasing lever 84 about the axis $P_7$, thus the torsion coil spring 83 is charged. When the torsion coil spring 83 is charged by the roller releasing lever 84, the roller holder 81 is not urged by the torsion coil spring 83. As a result, the roller 82 is incapable pressing the film against the spool 9.

The motor 1 is driven by the instruction of a microcomputer 40 to be described later clockwise and counterclockwise according to signals detected by the first and second switches SW1 and SW2. Thus, the film is wound or rewound.

The operation of the film winding/rewinding apparatus is described hereinafter. A release magnet (not shown) is energized in response to a release signal, then an aperture size is reduced by a spring and the mirror moves upward. At this time, the mirror lever 61 moves toward the right in FIG. 1 and stops at a position in the vicinity of the bent portion 28b at which the mirror lever 61 confronts the bent portion 28b. Thereafter, the shutter (not shown) travels and an exposure is completed, with the result that electricity is supplied to the motor 1 and the motor gear 1b rotates clockwise. Thereafter, the large gear 2a of the reduction gear 2 which engages with the motor gear 1b rotates counterclockwise and the reduction gear 3 which engages with the small gear 2b rotates clockwise. At this point, the projection 23c of the winding-stop lever 23 engages with the concave 22b of the winding-stop member 22 and the bent portion 114a of the lever 114 engages the gear tooth space 113a of the engaging plate 113. Therefore, the reduction gear 8 is not capable of rotating, and the three planetary gears 4, 4, and 4 are not capable of rotating on their axes, either. Accordingly, the planetary gears 4, 4, and 4 revolve and the gear 5, the carrier plate 6, and the shaft 7 rotate clockwise together. Thereafter, the rotation cam 10 starts rotating counterclockwise and when it rotates by a predetermined amount, the notched gear 10b engages with the spur gear 51a of the first diaphragm cocking gear 51, which in turn cocks the diaphragm through the second diaphragm cocking gear 52. As a result, the diaphragm is fully opened. Simultaneously with this, the mirror/shutter cocking cam 10c rotates the mirror cocking lever 28 clockwise about the axis $P_1$ and moves the mirror lever 61 toward the left in FIG. 1, with the result that the mirror moves downward and the shutter is cocked. The end portion 27a of the switch lever 27 disengages from the switch cam concave 10f. As a result, the switch lever 27 rotates clockwise about the axis $P_4$ and the contacts 33 and 32 are brought into contact with each other. Consequently, the second switch SW2 turns on. When the radius of the mirror/shutter cocking cam 10c becomes small rapidly, the cockings of the mirror and shutter are completed and the mirror cocking lever 28 is rotated counterclockwise about the axis $P_1$ by the spring 29, then the mirror cocking lever 28 returns to the original position. When the notched gear 10b disengages from the spur gear 51a of the first diaphragm cocking gear 51, the cocking of the diaphragm is completed. Subsequently, the winding-stop releasing cam 10e is brought into contact with the pin 23d of the winding-stop lever 23, thus rotating the winding-stop lever 23 clockwise about the axis $P_2$. As a result, the projection 23c of the winding-stop lever 23 disengages from the concave 22b of the winding-stop member 22, whereby the first switch SW1 is turned on. Consequently, the pin 23d of the winding-stop lever 23 is brought into contact with the end portion 114b of the lever 114, with the result that the lever 114 is rotated counterclockwise about the axis $P_8$ and the bent portion 114a of the lever 114 disengages from the gear space 113a of the engaging plate 113. Further, the winding-stop engaging lever 24 rotates clockwise and the top portion 24c thereof is brought into contact with the end portion 23e of the winding-stop lever 23.

In this case, before the winding-stop releasing cam 10e of the rotation cam 10 passes through the section where the cam 10e is brought into contact with the pin 23d, the projection 23c of the winding-stop lever 23 disengages from the concave 22b of the winding-stop member 22 and the lever 114 disengages from the engaging plate 113. Whether the planetary gears 4, 4, and 4 revolve or rotate at this point depends on the magnitudes of the loads to be applied to the gear 5 and the reduction gear 8. If the planetary gears 4, 4, and 4 rotate at this time, the winding-stop releasing cam 10e remains in contact with the pin 23d of the winding-stop lever 23. In this case, it is impossible for the projection 23c of the winding-stop lever 23 to engage again with the concave 22b of the winding-stop member 22 although this engagement is essential every time the film winding of one frame of the film is completed, the detail of which is described later. In order to prevent this, as described later, a load is applied to a film winding system so that the torque required for the winding-stop releasing cam 10e of the rotation cam 10 to pass through the section where the cam 10e contacts with the pin 23d is light even though the camera is not loaded with a film, whereby the planetary gears 4, 4, and 4 continue revolving.

When the winding-stop releasing cam 10e has passed through the section where the cam 10e contacts with the pin 23d of the winding-stop lever 23, the spring 34 urges the winding-stop lever 23 to rotate counterclockwise. But since the end portion 23a of the winding-stop lever 23 remains in contact with the peripheral face 24a of the winding-stop engaging lever 24, the lever 23 is incapable of rotating. When the rotation cam 10 rotates counterclockwise further, the roller cam 10d is brought in contact with the roller 26a supported rotatably by the roller-supporting plate 26 at one end thereof. At this time, the rotation cam 10 is incapable of rotating the roller-supporting plate 26 counterclockwise. This is because, the amount of the force of the torsion coil spring 34 which urges the roller-supporting plate 26 is set so that the load to be applied to the reduction gear 8 when the planetary gears 4, 4, and 4 rotate to wind the film is lighter than the load to be applied to the gear 5 when the rotation cam 10 rotates counterclockwise with pushing up the roller-supporting plate 26. Accordingly, at this time, the revolutions of the planetary gears 4, 4, and 4 are suspended and the rotations thereof are started, whereby the reduction gear 8 are rotated counterclockwise. Consequently, the gear 111 is rotated counterclockwise through the spring 112 and thus the spool 9 is rotated counterclockwise through the internal gear 9a integrated with the spool 9 to wind the film.

The gear 12 is rotated counterclockwise by the gear 8c formed on the peripheral face of the reduction gear 8 through the gear 11. The gear 13 is rotated together with the gear 12 through the torque which is transmitted from the gear 12 to the gear 13 by the spring 14. At this time, the spring 77 secured around the cylinder 76 is loosened and as such the cylinder 76 is capable of rotating with a light load. The gear 16a of the sprocket shaft 16 is rotated counterclockwise by the rotation of the gear 13 through the gear 15. Consequently, the gear 22a of the winding-stop member 22 rotates clockwise. Since the sprocket shaft 16 rotates counterclockwise, the sprocket 17 rotates counterclockwise, whereby the film is fed forward toward the spool 9.

As described above, the rotation of the motor 1 is transmitted to the sprocket 17 only when the camera is loaded with no film or an initial short period in an initial loading operation of the film. After three to four frames of the film are fed forward, the film is wound around the spool 9. In this case, the speed at which the film is pulled by the spool 9 is higher than the speed at which the film is fed forward by the sprocket 17. Thus, at this time, the gear 13 rotates faster than the gear 12, whereby the gear 13 rotates in a sliding contact relationship with the spring 14.

Since the sprocket 16 rotates counterclockwise, the winding-stop member 22 rotates clockwise. As shown in FIG. 6, the winding-stop member 22 has a projection 22c formed adjacent to the concave 22b with which the projection 23c of the winding-stop lever 23 has engaged. Immediately after the winding-stop member 22 starts rotating clockwise, the projection 22c is brought into contact with the projection 23c of the winding-stop lever 23 which has disengaged from the concave 22b and the winding-stop member 22 further pushes the winding-stop lever 23 clockwise about the axis $P_2$ while the winding-stop member 22 is rotating clockwise. The load to be applied to the winding-stop member 22 at this time is greater than the load to be applied to the winding-stop releasing cam 10e of the rotation cam 10 when the cam 10e passes through the section where the cam 10e contacts with the pin 23d. Therefore, the rotation cam 10 reliably continues rotating. When the roller cam 10d is brought in contact with the roller 26a of the roller-supporting plate 26, the rotation cam 10 stops. At this point, the planetary gears 4, 4, and 4 which has stopped revolutions start rotating.

While the winding-stop member 22 is further rotating clockwise, the projection 22c is brought into contact with the peripheral face 24d of the winding-stop engaging lever 24, thus rotating the winding-stop engaging lever 24 counterclockwise about the axis $P_5$ against the force of the spring 25, whereby the peripheral face 24a of the winding-stop engaging lever 24 disengages from the end face 23a of the winding-stop lever 23 and the winding-stop lever 23 rotates counterclockwise by a small amount, thus contacting with the peripheral face 22d of the winding-stop member 22. In this state, the first switch SW1 is still turned on and the lever 114 is rotated by a small amount by the urging force applied to the pin 23d of the winding-stop lever 23, but the top end portion 114a of the lever 114 does not engage with the gear space 113a of the engaging plate 113. When the winding-stop member 22 rotates by 360°, the projection 23c of the winding-stop lever 23 engages with the concave 22b. As a result, the rotation of the winding-stop member 22 is stopped. Thus, the feeding of one frame of the film is completed. At this time, the first switch SW1 is turned off. Then, the lever 114 is rotated clockwise by the urging force applied to the pin 23d of the winding-stop lever 23 and the top end portion 114a thereof engages with the gear tooth space 113a of the engaging plate 113, thus stopping the rotation of the reduction gear 8. As a result, the rotation of the spool 9 is stopped. When the winding-stop member 22 stops rotating, the sprocket shaft 16 immediately stops rotating. However, the engagement of the lever 114 with the engaging plate 113 lags behind the engagement of the winding-stop lever 23 with the winding-stop member 22. Therefore, the spool 9 continues rotating, thus pulling the film. Since there is the gap provided by the spring 21 between the sprocket shaft 16 and the sprocket 17, the sprocket 17 is capable of rotating by a small amount after the sprocket shaft 16 stops rotating. Thus, when the spool 9 pulls the film, a great amount of tension is not applied to the film. Therefore, film perforations are not broken. If the lever 114 does not engage with the engaging plate 113, the spool 9 rotates a considerable amount because the planetary gears 4, 4, and 4 do not immediately stop rotating due to the backlash of gears when the winding-stop member 22 stops rotating. Thus, the gap provided between the sprocket shaft 16 and the sprocket 17 is not sufficient to prevent film perforations from being broken. Further, it takes a long time for the film winding to be completed.

During the film winding, the spring 85 mounted on the upper cylinder 9b of the spool 9 rotates counterclockwise and urges the roller releasing lever 84 to rotate counterclockwise about the axis $P_7$ through the arm 85a. But a stopper 9'' is provided at a certain position to prevent the counterclockwise rotation of the roller releasing lever 84 about the axis $P_7$. As a result, the spring 85 is slid on the cylinder 9b by a small amount of a force. The substrate 18 mounted on the upper portion of the sprocket shaft 16 is rotated by the rotation of the sprocket shaft 16, with the result that the third switch SW3 is repeatedly turned on and off.

The motor 1 keeps rotating after the engagement of the lever 114 with the engaging plate 113. When the lever 114 engages with the engaging plate 113, the reduction gear 8 stops rotating, which prevents the planetary gears 4, 4, and 4 from rotating Consequently, the planetary gears 4, 4, and 4 starts revolving and the rotation cam 10 rotates with rotating the roller-supporting plate 26 counterclockwise about the axis $P_2$.

Figure 8:
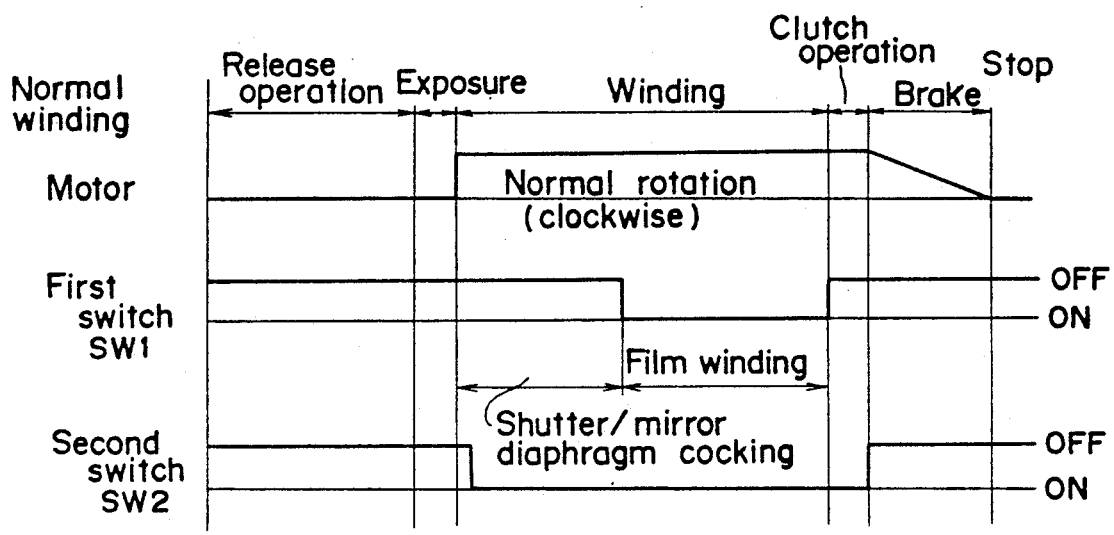
FIG. 8 through FIG. 11 are timing charts of a film winding; the initial loading of the film; the automatic return of the film; and the film rewinding before all frames thereof are exposed in the film winding/rewinding apparatus.

The torsion coil spring 34 contracts the roller-supporting plate 26 and the winding-stop lever 23 so that the force of the rotation cam 10 for rotating the roller-supporting plate 26 counterclockwise at the time when the projection 23c of the winding-stop lever 23 engages with the concave 22b of the winding-stop member 22 is smaller than at the time when the former disengages from the latter. That is, when the winding-stop lever 23 disengages from the winding-stop member 22, the torsion coil spring 34 is charged. Therefore, the roller-supporting plate 26 is urged in a great extent by the torsion coil spring 34. As described in detail later, the roller-supporting plate 26 is rotated counterclockwise when tension is applied in winding the last frame of the film. If the force for winding the film is great, there may occur the misjudgement that the last frame of the film has been wound up. But, in this embodiment, since the force of the rotation cam 10 is set as described above, the misjudgement is prevented. And, in addition, it is possible to operate the roller-supporting plate 26 by a light force when one frame of the film is being wound, whereby the film is wound at a high speed. When the roller 26a passes the section where it contacts with the roller cam 10d, the end portion 27a of the switch lever 27 is brought in contact with the switch cam 10f and the second switch SW2 is turned off. As a result, the motor 1 is braked. The motor 1 cannot be stopped from rotating by inertia immediately after it is braked. Therefore, the rotation cam 10 continues rotating, with the result that the roller 26a is brought in contact with the concave 10g, then rotates in contact with the gentle curved face 10h. The face 10h functioning as a resistance is effective for braking the motor 1. When the rotation cam 10 rotates by about 360°, it stops, i.e., it returns to the original state. Thus, the film winding operation is completed. The timing relationship between the first switch SW1 and the second switch SW2 is shown in FIG. 8.

When the roller-supporting plate 26 rotates, the rotation cam 10 attempts to rotate faster than the motor 1 due to the reaction of the roller-supporting plate 26.

More specifically, if the lever 114 does not engage with the engaging plate 113 when the motor 1 is braked, the rotation cam 10 reverses the rotation of the spool 9, i.e., the rotation cam 10 does not stop rotating even if the motor 1 is braked. The lever 114 stops the rotation of the spool 9, thus connecting the motor 1 and the rotation cam 10 with each other, i.e., owing to the engagement of the lever 114 with the engaging plate 113, the rotation cam 10 is reliably stopped when the motor 1 is braked.

During the film winding operation, the rewinding gear 71 engaging with the second small gear 3c of the reduction gear 3 is rotated counterclockwise by the clockwise rotation of the reduction gear 3. Since the carrier 73 rotates counterclockwise about the axis $P_6$ by the friction between the rewinding gear 71 and the carrier 73, the change-over planetary gear 72 does not engage with the leftmost gear 74a of the rewinding gear train 74. During this operation, the encoder plate 103 is always rotating. Therefore, the fourth switch SW4 produces pulses. These pulses are monitored by the microcomputer 40. According to the pulses, the microcomputer 40 switches the coils of the motor 1 when the rotational speed of the motor 1 reaches a predetermined speed.

Figure 9:
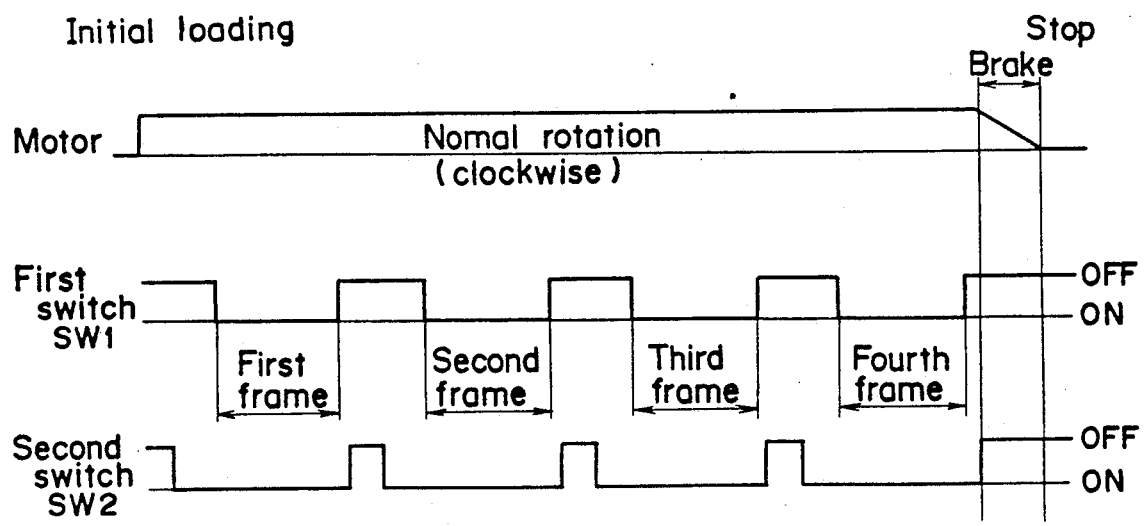

The operation to be carried out at the time of an initial loading of the film is described hereinbelow. When the film is loaded in the camera and the back lid is closed, a switch (not shown) is turned on and electricity is supplied to the motor 1. The motor 1 rotates clockwise as well as in the film-winding operation. Similarly to the above-described normal winding operation, first, the rotation cam 10 rotates counterclockwise. As a result, the notched gear 10b engages with the spur gear 51a of the first diaphragm cocking gear 51 and the mirror cocking lever 28 rotates clockwise about the axis $P_1$. At this time, since a shutter release operation is not performed, no load is not applied to the rotation cam 10 due to a cocking operation and the cam 10 rotates idly. The winding-stop releasing cam 10e contacts with the pin 23d of the winding-stop lever 23, thus rotating the winding-stop lever 23 clockwise. As a result, the winding-stop releasing cam 10e disengages from the winding-stop member 22. Thereafter, similarly to the above-described operation, the film is fed forward. When one frame of the film has been fed forward, the rotation cam 10 starts rotating. Consequently, the second switch SW2 is turned off. During this time, the motor 1 is not braked, i.e., electricity is kept supplied to the motor 1. As a result, the rotation cam 10 continues rotating, thus engaging the notched gear 10b with the spur gear 51a of the first diaphragm cocking gear 51 and the mirror cocking lever 28 rotates clockwise about the axis $P_1$. When the fourth frame of the film is fed forward by repeating similar operations, the second switch SW2 is turned off again. At this time, the motor 1 is braked by the instruction of the microcomputer 40. Thus, the initial loading of the film is completed. The timing chart of the initial leading is shown in FIG. 9.

Figure 10:
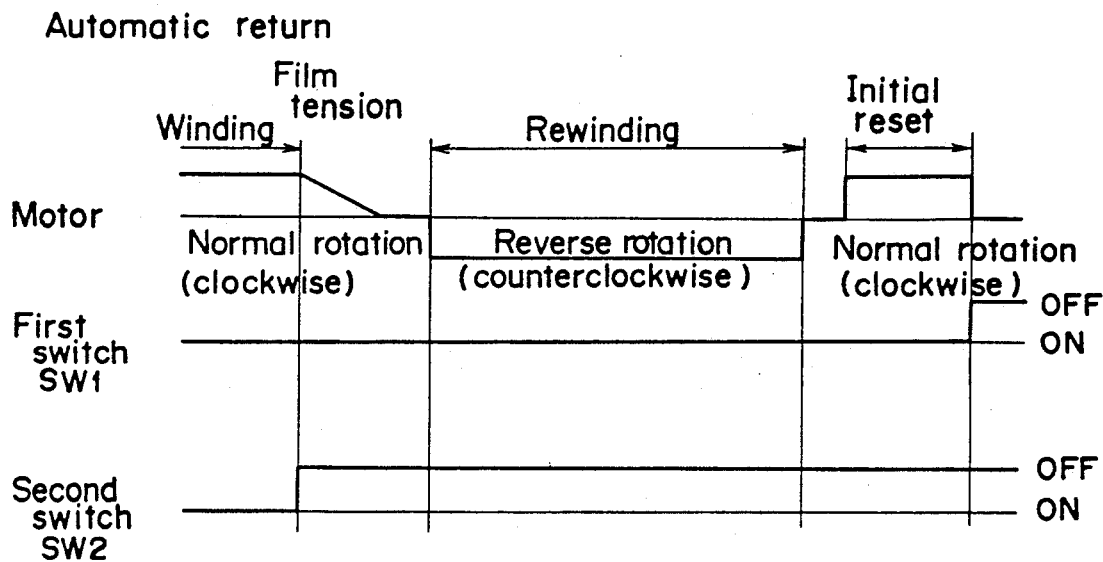

Next, the operation of the "automatic return" is described. The "automatic return" is performed when tension is applied to the film during the final frame of the film being wound. When tension is applied to the film the spool 9 is incapable of rotating. As a result, the reduction gear 8 stops rotating. Therefore, the planetary gears 4, 4, and 4 are incapable of rotating, but revolve as with the case in which one frame of the film has been fed forward. As a result, the rotation cam 10 rotates counterclockwise, whereby the roller 26a of the roller-supporting plate 26 rotates in contact with the roller cam 10d and the second switch SW2 is turned off. At this time, the motor 1 is braked by the instruction of the microcomputer 40. Consequently, the rotation cam 10 stops after rotating for some time similarly to the case in which the winding of one frame of the film is completed. At this time, since the projection 23c of the winding-stop lever 23 does not engage with the concave 22b of the winding-stop member 22, the first switch SW1 remains OFF. When the microcomputer 40 detects that the first switch SW1 is ON, it is decided that the last frame of film has been wound. Thereafter, as shown in FIG. 10, electricity is supplied to the motor 1 to rotate counterclockwise, that is, in the opposite direction to the winding direction Due to the counterclockwise rotation of the motor 1, the rewinding gear 71 rotates clockwise through the second small gear 3c and the carrier 73 rotates clockwise about the axis $P_6$. Consequently, the change-over gear 72 engages with the leftmost gear 74a of the rewinding gear train 74, whereby the rewinding fork gear 75 rotates clockwise through the rewinding gear train 74 and the film is rewound into the patrone. Since the roller 26a of the roller-supporting plate 26 is brought in contact with the concave 10g, the rotation cam 10 is not capable of rotating clockwise. As a result, the planetary gears 4, 4, and 4 rotate, thus rotating the reduction gear 8 clockwise. Accordingly, the spool 9 rotates clockwise, thus rotating the roller releasing lever 84 clockwise about the axis $P_7$ by means of the spring 85 wound around the cylinder 9b mounted on the upper portion of the spool 9. Accordingly, the bent portion 84a of the roller releasing lever 84 is brought into contact with the arm 83a of the torsion coil spring 83, thus charging the torsion coil spring 83. At this time, the spring 85 and the cylinder 9b of the spool 9 closely contact with each other without sliding, thus having a transmittable torque enough to charge the torsion coil spring 83. When the torsion coil spring 83 is charged, the roller 82 is not urged by the urging force of the torsion coil spring 83, with the result that the film is loosened in the spool chamber and the film does not contact with the spool 9. Consequently, the load to be applied to the film when it is rewound by the rewinding fork gear 75 into the patrone is reduced and the film does not contact with each other. Thus, the film is not damaged Since the lower end portion 85b of the spring 85 contacts with a stopper 9' when the roller releasing lever 84 is sufficiently rotated clockwise, the spring 85 is incapable of rotating any further. Thereafter, the spring 85 and the cylinder 9b of the spool 9 are in the sliding contact relationship. The gear 12 is rotated clockwise by the clockwise rotation of the reduction gear 8 through the gear 11. Thus, the upper end portion 14a of the spring 14 engages with the notch 76a of the cylinder 76. Consequently, the cylinder 76 cannot be rotated clockwise by the spring 77. As a result, the spring 14 cannot rotate clockwise and the spring 14 does not rotate together with the gear 12. Accordingly, the torque of the gear 12 is not transmitted to the gear 13, that is, the gears 12 and 13 are in the sliding contact relationship. Then, the gear 13 is capable of rotating clockwise independently of the gear 12. The sprocket 17 rotates clockwise in association with the rewinding of the film into the patrone. Accordingly, the sprocket shaft 16 rotates clockwise and the gear 13 rotates clockwise through the gear 15.

As described above, since the gear 13 is capable of rotating independently of the gear 12, it is not affected by the rotation of the motor 1. Therefore, when the film is rewound to the position in which the film disengages from the sprocket 17, the sprocket 17 stops rotating. Since the sprocket 17 rotates clockwise, the winding-stop member 22 rotates counterclockwise. So long as the winding-stop member 22 is rotating counterclockwise, it does not occur that the projection 23c of the winding-stop lever 23 engages with the concave 22b of the winding-stop member 22. This is for the reason described hereinbelow. That is, even when the projection 22c of the winding-stop member 22 is brought into contact with the peripheral face 24d of the winding-stop engaging lever 24, and thus rotating the winding-stop engaging lever 24 counterclockwise about the axis $P_5$, and as a result, the winding-stop engaging lever 24 is disengaged from the winding-stop lever 23, the projection 22c of the winding-stop member 22 contacts with the projection 23c of the winding-stop lever 23 immediately before the projection 23c of the winding-stop lever 23 is to engage with the concave 22b of the winding-stop member 22. Thus, the winding-stop lever 23 is again rotated clockwise about the axis $P_2$ and the winding-stop engaging lever 24 rotates clockwise. As a result, the winding-stop lever 23 engages with the winding-stop engaging lever 24.

The third switch SW3 is repeatedly turned on and off according to the rotation of the sprocket 17, but when the film disengages from the sprocket 17, the sprocket 17 stops rotating, with the result that the third switch SW3 remains either ON or OFF. The microcomputer 40 decides the completion of the rewinding of the film when it detects this state. Thereafter, electricity is not supplied to the motor 1 is cut off to stop the rotation of the rewinding fork gear 75. In this embodiment, in order to switch the coils of the motor 1, the number of rotations of the motor 1 is monitored by the microcomputer 40. When the film disengages from the sprocket 17, the load of the motor for rotating at least the sprocket 17, the sprocket shaft 16, the gears 12, 15, and the winding stop member 22 is reduced. Accordingly, the rotation speed of the motor 1 becomes higher. Then, when the microcomputer 40 detects this, it can also decide that the film-rewinding is completed.

After electricity supplied to the motor 1 is cut off, as shown in FIG. 10, electricity is supplied to the motor 1 again to rotate clockwise to wind the film. As a result, the lever 23 and the winding-stop member 22 engage with each other and the first switch SW1 is turned off. At this time, the motor 1 is braked through the microcomputer 40. Thus, the film-rewinding operation is completed.

Figure 11:
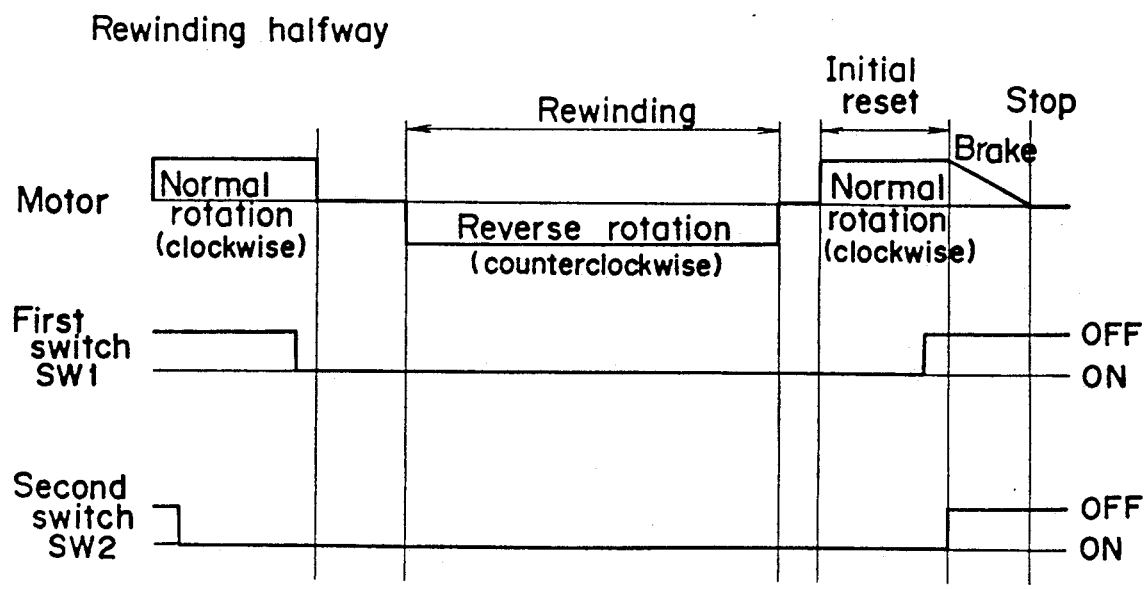

When a photographer pushes a switch in order to rewind the film before all the frames of the film are exposed, the motor 1 starts rotating in the film winding direction as shown in FIG. 11. As a result, the rotation cam 10 rotates counterclockwise but cocking operations are not performed as well as the initial loading of the film which is described before. But soon, the winding-stop releasing cam 10e contacts with the pin 23d of the winding-stop lever 23, thus disengaging the winding-stop lever 23 from the winding-stop member 22. At this time, the first switch SW1 turns on. A predetermined period of time after the microcomputer 40 detects that the first switch SW1 turns on, the electricity applied to the motor 1 is cut off. The predetermined period of time mentioned above is a period of time required for the roller cam 10d contacting with the roller 26a of the roller-supporting plate 26. Thereafter, electricity is again applied to the motor 1 to rotate counterclockwise. As a result, as described above, the rewinding fork gear 75 is rotated, whereby the film is rewound. The rotation cam 10 is prevented from rotating clockwise by bringing the portion of the mirror/-shutter cocking cam 10c, at which the radius thereof is greatly varied into contact with the end portion 28a of the mirror cocking lever 28.

As described previously, when the microcomputer 40 detects the completion of the rewinding, electricity supplied to the motor 1 is cut off and, thereafter, is supplied to the motor 1 to rotate in the film winding direction (clockwise). At this time, even when the winding-stop member 22 engages with the engaging lever 23 and accordingly the first switch SW1 turns off, electricity is kept supplied to the motor 1. When the roller 26a of the roller-supporting plate 26 is brought into contact with and passes the roller cam 10d and the second switch SW2 turns off, the motor 1 is braked, whereby the rotation cam 10 rotates to the original position, then stops. Thus, the film rewinding operation is completed.

Figure 12:
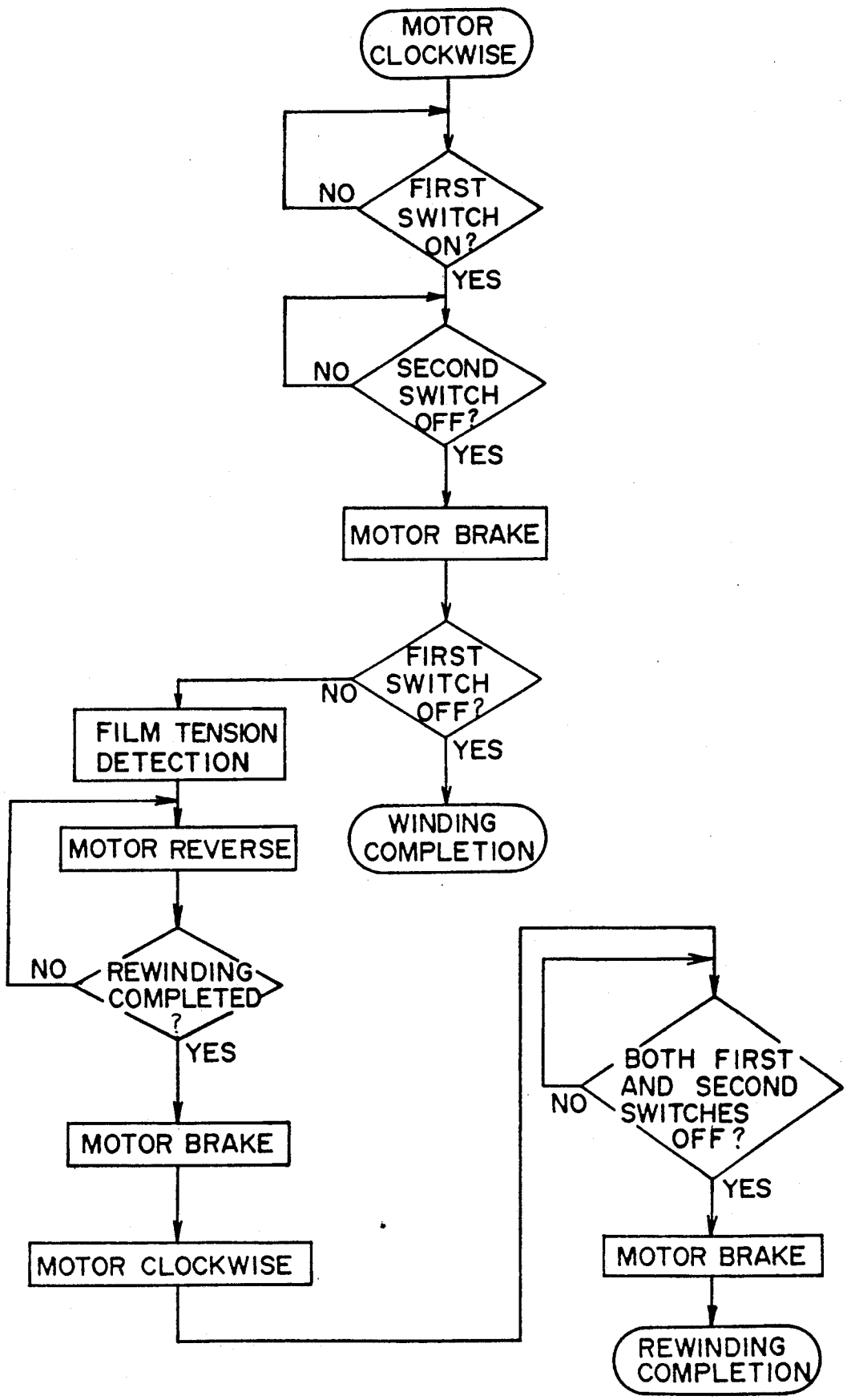
FIG. 12 is a flowchart showing the operation of the film winding/rewinding apparatus.

In each of the above-described operations, the rotation of the motor 1 is controlled by the microcomputer 40 serving as a control means. The flowchart for controlling the motor 1 is shown in FIG. 12. Referring to FIG. 12, after the motor 1 is rotated clockwise to wind the film, it is detected whether or not the first switch SW1 is OFF, i.e., it is detected whether or not the projection 23c of the winding-stop lever 23 has engaged with the concave 22b of the winding-stop member 22. If the first switch SW1 is OFF, i.e., if the projection 23c has engaged with the concave 22b, the motor 1 is kept rotated clockwise. When the first switch SW1 is turned on a result of the disengagement of the projection 23c of the winding-stop lever 23 from the concave 22b cf the winding-stop member 22 by the operation of the winding-stop releasing cam 10e, it is detected whether or not the second switch SW2 is OFF, i.e., it is detected whether or not the top portion 27a of the switch lever 27 is brought in contact with the switch cam 10f of the rotation cam 10. If the second switch is ON, the motor 1 is kept rotated until the second switch SW2 is OFF, i.e., until the top portion 27a of the switch lever 27 is brought in contact with the switch cam 10f. When the second switch SW2 turns off, the motor 1 is braked to stop rotating and it is detected again whether or not the first switch SW1 is OFF. If the first switch SW1 is OFF, it is decided that one frame of the film has been fed forward. If the first switch SW1 is ON, it is decided that the last frame of the film has been wound. Consequently, the motor 1 is reversed (rotated counterclockwise). Thereafter, the film is rewound into the patrone. During the rewinding of the film, the third switch SW3 turns on and off repeatedly. When it is detected that the third switch SW3 remains either ON or OFF or that the rotational speed of the motor 1 increases, i.e., when the completion of the rewinding of the film is detected, the motor 1 is braked to stop rotating. Immediately thereafter, the motor 1 is rotated in the normal direction (clockwise). Then, it is detected whether or not the first switch SW1 and the second switch SW2 are OFF. If both switches SW1 and SW2 are OFF, the motor 1 is braked to stop rotating. Thus, the film rewinding operation is completed.

Figure 13:
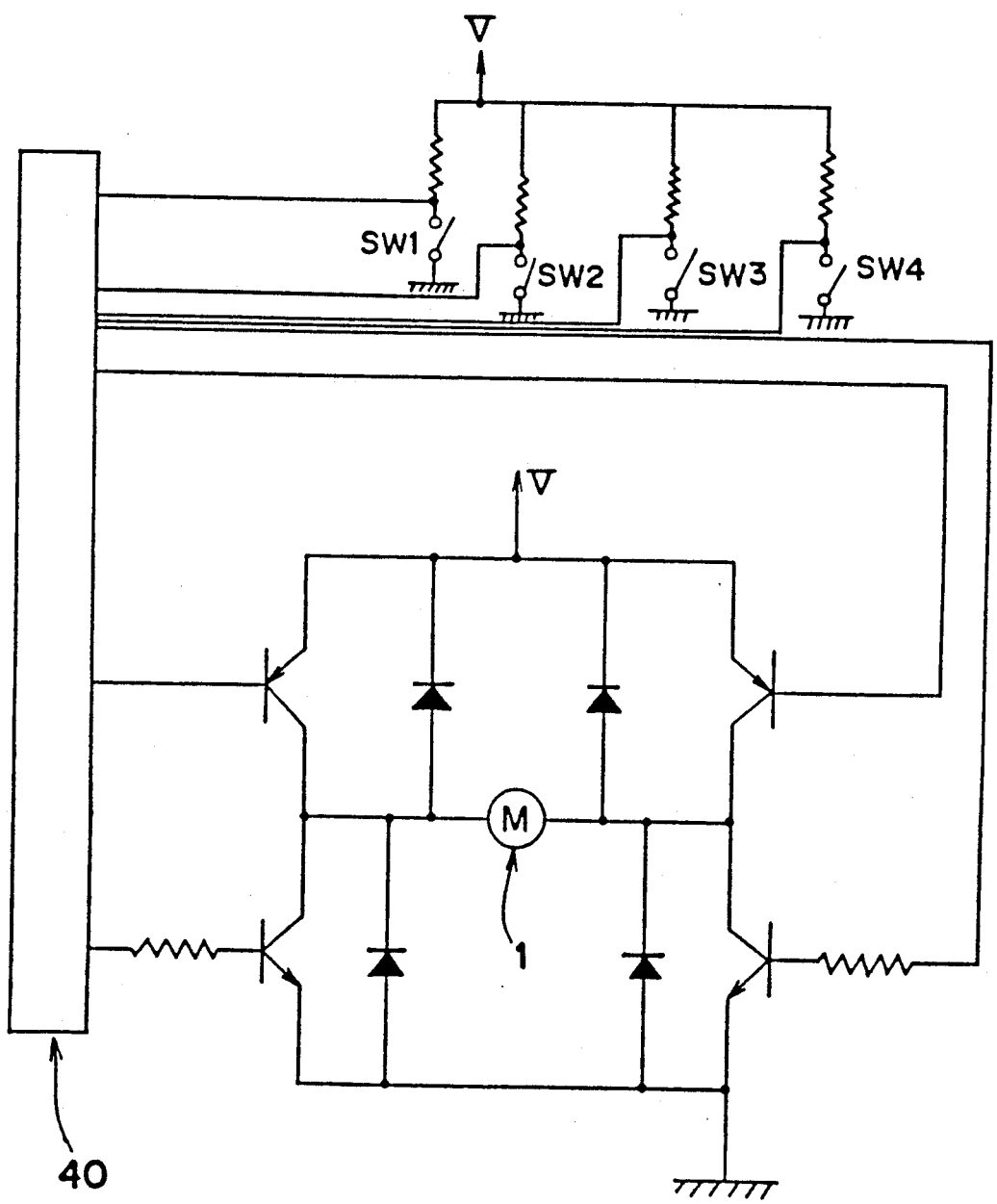
FIG. 13 is a view showing the change-over circuit of the motor rotation of the film winding/rewinding apparatus.

FIG. 13 shows the microcomputer 40 to which the ON and OFF signals of the first switch SW1 through the fourth switch SW4 are inputted and a circuit for rotating the motor 1 clockwise and counterclockwise by the instruction of the microcomputer 40. Referring to FIG. 13, the motor 1 is connected to four diodes and four transistors which compose a change-over circuit. The polarity of the direct current voltage to be applied to the motor 1 is switched through the circuit, whereby the motor 1 is rotated clockwise and counterclockwise.

In the embodiment described above, the diaphragm, the mirror, and the shutter are cocked, however, all of them do not have to be cocked, e.g., only the shutter, the mirror and the shutter or the diaphragm and the mirror may be cocked.

In the embodiment described above, the outer cylinder containing the motor is utilized as the spool, however, it is possible to construct the spool in the apparatus without utilizing the outer cylinder of the motor. Further, the one end portion 85a of the spring 85 may be used as a member which contacts with the stopper for preventing the rotation of the roller releasing lever 84 instead of the roller releasing lever 84 constituting part of the film pressing member.

A clutch portion may be constructed by mounting a lever made of an unelastic material on the cylinder 9b of the spool 9 instead of the spring 85. In this case, when the spool 9 rotates in the direction opposite to the film winding direction, the lever rotates by the friction with the cylinder 9b, thus rotating the roller releasing lever 84 clockwise about the axis $P_7$, whereby the film is not pressed against the spool 9 by the roller 82. When the lever is brought in contact with a stationary pin (the stopper with which the lower end portion 85b of the spring 85 contacts) 9', the cylinder 9b of the spool 9 continues rotating in a sliding contact relationship with the lever. While the film is being wound, the lever rotates due to the friction with the cylinder 9b, thus rotating the roller releasing lever 84 counterclockwise about the axis $P_7$. When the lever contacts with the stopper for preventing the rotation of the roller releasing lever 84, the cylinder 9b of the spool 9 continues rotating in a sliding contact relationship with the lever, whereby the film is normally wound around the spool 9.

Figure 14:
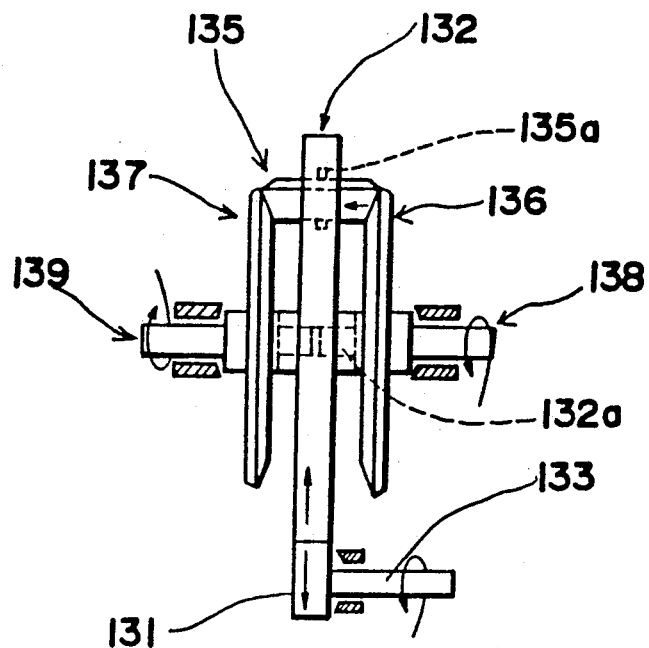
FIGS. 14 and 15 are front views showing modifications of the differential gear mechanism of the embodiment.

Further, in addition to the above-described differential gear mechanism comprising the reduction gears 2, 3, planetary gears 4, the gear 5, the carrier plate 6, the shaft 7, and the reduction gear 8, other mechanisms may be employed. As shown in FIG. 14, a bevel gear 135 is rotatably mounted on a spur gear 132 by means of a pin 135a perpendicular to the shaft 132a of a spur gear 132. A bevel gear 136 confronts a bevel gear 137 between which the spur gear 132 is provided and shafts 138 and 139 for rotating the spur gears 136 and 137 are mounted so that the shafts of the bevel gears 136 and 137 coincide with the shaft 132a. The drive force of the motor is transmitted to the bevel gear 136. The bevel gear 135 engages with both bevel gears 136 and 137. The spur gear 132 engages with a spur gear 131 coupled with a shaft 133.

In the above-described construction, when the shaft 138 rotates clockwise, the shaft 139 rotates counterclockwise at the same speed as the shaft 138 with the spur gear 132 not driven. But, when the spur gear 132 is rotated about the shaft 132a and when the shaft 138 rotates in the same direction at a constant speed, the shaft 139 can be rotated at a high or a slow speed clockwise or counterclockwise and the rotation of the shaft 139 can be stopped. In the above-described construction, if the load of the shaft 133 is greater than that applied to the shaft 139, the bevel gear 135 rotates and the bevel gear 137 rotates. If the load of the shaft 133 is smaller than that of the shaft 139, the bevel gear 135 revolves about the shafts 138 and 139 and the spur gear 132 rotates. The first small gear 3b, the planetary gears 4, the gear 5, and the reduction gear 8 in the above-described embodiment correspond to the bevel gear 136, the bevel gear 135, the spur gear 132, and the bevel gear 137 in this modification, respectively.

Figure 15:
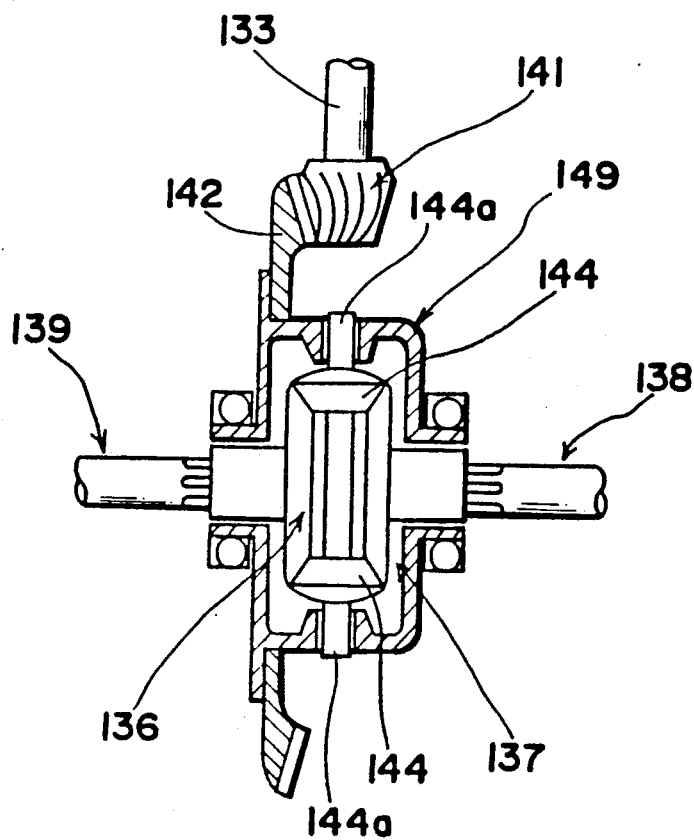

Still another example of the differential gear mechanism similar to that shown in FIG. 14 is shown in FIG. 15. In this example, since bevel gears 141 and 142 are used instead of the spur gears 131 and 132, a shaft 133 is perpendicular to the shafts 138 and 139. That is, the shaft 133 is coupled with a bevel gear 141 and the bevel gear 141 engages with the bevel gear 142. A casing 149 is fixed to approximately the center of the bevel gear 142 and the casing 149 rotates together with the bevel gear 142. The bevel gears 136 and 137 which confront each other are rotatably accommodated in the casing 149. The bevel gears 136 and 137 engage with small bevel gears 144 and 144. The small bevel gears 144 and 144 supports the shafts 144a and 144a, so that the shafts 144a are rotatable in the casing 149 and the small bevel gears 144 are rotatable together with the casing 149. Accordingly, the small bevel gears 144 are rotatable on the shafts 138 and 139 of the bevel gears 136 and 137.

In the above-described construction, when the loads to be applied to the shafts 138 and 139 are approximately the same and when the bevel gear 141 rotates the bevel gear 142, the casing 149 and the small gears 144 and 144 rotate together and the shafts 138 and 139 are rotated at the same speed. If the load to be applied to the shaft 139 is greater than that to be applied to the shaft 138, the shaft 138 rotates faster than the shaft 139. The parts shown in FIG. 15 similar to those shown in FIG. 14 are denoted by the same reference numerals and the descriptions thereof are omitted.

In the above-described embodiment, the clockwise rotation of the motor 1 and the counterclockwise rotation thereof are switched to each other by the microcomputer 40. The film is wound by rotating the motor 1 clockwise. If it is decided that the final frame of the film has been wound around the spool 9 because tension is applied to the film, the motor 1 is rotated counterclockwise to automatically rewind the film. Therefore, the film winding apparatus eliminates the need for manually performing the change-over of switches. The source for winding and rewinding the film in the apparatus is only one motor. Accordingly, a small space suffices for accommodating the source, which leads to the manufacture of inexpensive cameras. When the last frame of the film has been wound around the spool 9, the first switch SW1 and the second switch SW2 detect the state of the respective cams, namely, the rotation cam 10 and the winding-stop member 22. The detected information can be decided promptly by the microcomputer 40. More specifically, compared with a known apparatus of this kind which detects the winding of the last frame of the film when a film winding operation is not completed in a predetermined time, the apparatus in accordance with the present invention is capable of detecting the winding of the last frame of the film the moment when tension is applied to the film. Therefore, the period of time required for detecting the winding of the last frame of the film is shorter than that required in the known cameras. Further, the apparatus eliminates the need for being provided with a mechanism for detecting the completion of the winding of the film. The reason is as follows: It is detected by the second switch SW2 that the roller cam 10d of the rotation cam 10 for driving the cocking mechanism has passed the roller 26a in contact therewith and in addition, the first switch SW1 detects the state of the contact between the winding-stop member 22 and the winding-stop lever 23, i.e., the first switch SW1 detects whether or not the former and the latter engages with each other. The information detected by the switches SW1 and SW2 are decided by the microcomputer 40. Furthermore, the differential gear mechanism comprising the reduction gear 3, the planetary gears 4, the gear 5, the carrier plate 6, the shaft 7, and the reduction gear 8 is driven by the motor 1 so that the film is fed forward from the sprocket 17 to the spool 9 so as to wind the film around the spool 9. Compared with a known winder type apparatus, namely, the apparatus in which a spring is charged in a great extent for the quick return mirror mechanism to quickly return the mirror to the original position is used, the film winding/rewinding apparatus in accordance with the present invention consumes a small amount of energy and can wind the film at a higher speed.

In the embodiment, after the operation for cocking the diaphragm, the mirror, and the shutter is completed by the first and second diaphragm cocking gears 51 and 52 and the mirror cocking lever 28 which constitute the cocking mechanism, the winding-stop lever 23 is disengaged from the winding-stop member 22 constituting the film winding mechanism by the winding-stop releasing cam 10e of the rotation cam 10 which drives the cocking mechanism. At this time, since the load to be applied to the film winding mechanism is greater than that to be applied to the cocking mechanism, the rotation cam 10 further rotates, thus completely disengaging the winding-stop lever 23 from the winding-stop member 22. Thereafter, the projection 10d, namely, the roller cam 10d of the rotation cam 10 which drives the cocking mechanism engages with the roller 26a under a large load so as to stop the rotation of the rotation cam 10. The winding mechanism is rotated under a small load through the differential gear mechanism comprising the gears 3 through 8 so as to wind the film. Accordingly, after the operation for cocking the diaphragm, the mirror, and the shutter, the film winding operation can be reliably accomplished.

In the embodiment, during the cocking operation, the roller 26a of the roller-supporting plate 26 functioning as an engaging member disengages from the rotation cam 10 and the winding-stop lever 23 reliably engages with the winding-stop member 22 by the urging force of the spring 34. During the film winding operation, the rotation cam 10 and the roller 26a of the roller-supporting plate 26 reliably engage with each other and the winding-stop lever 23 disengage from the winding-stop member 22. That is, in the winding-stop member 22 and the rotation member 10, when one of these two members is in a disengaged condition, the other is in an engaged condition. In order to release the engaged condition, a heavy load is required against the urging force of the spring 34. In other words, when either of these two members is in an engaged condition, the other member can be disengaged by a small load. Accordingly, when the winding-stop member 22 engages with the winding-stop lever 23 after one frame of the film has been fed forward, the roller 26a of the roller-supporting plate 26 can be disengaged from the rotation cam 10 by a small load. Therefore, the reduction ratio of the gear which drives the rotation cam 10 can be reduced and even if the voltage of a battery is lowered, the roller-supporting plate 26 can be reliably disengaged from the rotation cam 10.

If tension is applied to the film between the spool 9 and the patrone as a result of the completion of the winding of the last frame of the film, the winding mechanism and the winding-stop member 22 stop rotating. As a result, the winding-stop member 22 stops rotating without the winding-stop lever 23 engaging with the winding-stop member 22. Thereafter, the planetary gear mechanism causes the rotation cam 10 to rotate, with the result that the roller cam 10d of the rotation cam 10 disengages from the roller 26a of the roller-supporting plate 26. Thereafter, the end portion 27a of the switch lever 27 is brought in contact with the concave 10f of the cam 10, with the result that the second switch SW2 turns off. Accordingly, when tension is applied to the film because of the completion of the winding of the last frame of the film, the first switch SW1 turns on and the second switch SW2 turns off. By detecting the ON/OFF states of the switches SW1 and SW2, the microcomputer 40 can decide that the last frame of the film has been wound.

In the embodiment, during the film rewinding operation, the coil spring 85 constituting part of the clutch method rotates together with the spool 9 and the film pressing roller 82 is urged in the direction in which it is moved away from the peripheral face of the spool 9 against the urging force of the coil spring 83, whereby the film pressing force of the roller 82 can be removed. Accordingly, when the film is rewound, the film is not damaged and the load for the film rewinding is not great. According to this construction, in the camera in which the outer cylinder containing the motor 1 is utilized as the spool 9, the need for providing a mechanism for cutting off the force to be transmitted from the motor 1 to the spool 9 can be eliminated. Further since reduction ratio of the film rewinding mechanism is not limited, the film can be rewound at a higher speed.

In the embodiment, when the winding of the film has been stopped, the sprocket 17 rotates together with the film in the gap provided between the projection 16b of the sprocket shaft 16 which has stopped from rotating and the concave 17a of the sprocket 17. Accordingly, a strong tension is not applied to the film and the perforations of the film can be prevented from being damaged. Further, the shock is not applied parts adjacent to the back lid of the camera, which does not make a photographer holding the camera uncomfortable.

When the winding-stop lever 23 engages with the winding-stop member 22, the lever 114 engages with the engaging plate 113 in the above-described engaging mechanism, which stops the rotation of the spool 9. Accordingly, the construction of the control mechanism of the motor 1 can be simplified and a strong tension can be prevented from being applied to the film.

Followed by the engagement of the winding-stop lever 23 with the winding-stop member 22, the lever 114 engages with the engaging plate 113, whereby the rotation of the spool 9 can be stopped. Consequentially, the reaction generated when the rotation cam 10 engages with the roller 26a stops the drive of the motor 1. Thereafter, the rotation cam 10 rotates further, whereby the reverse rotation of the spool 9 can be efficiently prevented. That is, if the above-described means is not provided when the roller 26a engages with the roller cam 10d of the rotation cam 10 and the motor 1 is braked to stop, the rotation cam 10 will rotate faster than the motor 1 by means of the reaction generated due to the engagement of the roller cam 10d with the roller 26a and the rotation cam 10 will rotate the spool 9 in the reverse direction. And, in addition, the rotation cam 10 keeps rotating even though the motor 1 is braked. However, in the present invention, since the spool 9 is stopped from rotating, it can be prevented that the rotation cam 10 rotates the spool 9 in the reverse direction. Furthermore, the rotation cam 10 can be reliably stopped by only braking the motor 1.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A film rewinding apparatus comprising:
a motor;
a spool connected to said motor and winding a film;
a film rewinding mechanism removably connected to a patrone and connected to said motor and adapted for rewinding the film into said patrone;
a clutch member coupled with a connecting portion of said spool and for sliding relative to said spool after rotating by a predetermined angle together with said spool both in normal and reverse directions; and
a film pressing member to be pressed against a peripheral face of said spool by an urging member during a film winding operation and moved to be distant from a peripheral face of said spool against the force of the urging member when said clutch member rotates by more than a predetermined angle during a film rewinding operation.

2. A film rewinding apparatus as claimed in claim 1, wherein said clutch member comprises a coil spring mounted around a peripheral face of said connecting portion of said spool; a roller release lever engaging one end of said coil spring and said film pressing member; said connecting portion from which the other end of said coil spring projects; a first stopper provided in a periphery of said connecting portion with which the other end of said coil spring contacts after the other end of said coil spring rotates by a predetermined angle in a film rewinding direction; a second stopper, with which the one end of said coil spring contacts after rotating by a predetermined angle in the film winding direction; wherein during the film winding operation, the one end of said coil spring contacts with said second stopper after said coil spring rotates by a predetermined angle together with the connecting portion of said spool in the film winding direction so as to allow said coil spring to slide relative to the connecting portion of said spool, and during the film rewinding operation, the other end of said coil spring contacts with said first stopper after said coil spring rotates together with the connecting portion of said spool in a predetermined angle in the film rewinding direction so as to allow said coil spring to slide relative to the connecting portion of said spool.

* * * * *